US009674521B2

(12) United States Patent
Lee et al.

(10) Patent No.: US 9,674,521 B2
(45) Date of Patent: Jun. 6, 2017

(54) PREDICTION METHOD AND APPARATUS FOR CHROMA COMPONENT OF IMAGE USING LUMA COMPONENT OF IMAGE

(75) Inventors: Tammy Lee, Seoul (KR); Jianle Chen, Suwon-si (KR); Vadim Seregin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 744 days.

(21) Appl. No.: 14/130,098

(22) PCT Filed: Jun. 28, 2012

(86) PCT No.: PCT/KR2012/005151
§ 371 (c)(1),
(2), (4) Date: Jan. 31, 2014

(87) PCT Pub. No.: WO2013/002589
PCT Pub. Date: Jan. 3, 2013

(65) Prior Publication Data
US 2014/0140401 A1    May 22, 2014

Related U.S. Application Data

(60) Provisional application No. 61/501,985, filed on Jun. 28, 2011.

(51) Int. Cl.
*H04N 19/186* (2014.01)
*H04N 19/117* (2014.01)
(Continued)

(52) U.S. Cl.
CPC ..... *H04N 19/00315* (2013.01); *H04N 19/117* (2014.11); *H04N 19/182* (2014.11);
(Continued)

(58) Field of Classification Search
CPC ........... H04N 19/00315; H04N 19/593; H04N 19/59; H04N 19/186; H04N 19/182; H04N 19/117
(Continued)

(56) References Cited

U.S. PATENT DOCUMENTS 7,236,524 B2    6/2007    Sun et al.
8,111,756 B2    2/2012    Guo et al.
(Continued)

FOREIGN PATENT DOCUMENTS

CN    101394565 A    3/2009
CN    101494792 A    7/2009
(Continued)

OTHER PUBLICATIONS

Communication dated Dec. 9, 2014 issued by the Japanese Patent Office in counterpart Japanese Patent Application No. 2014-518808.
(Continued)

*Primary Examiner* — Christopher S Kelley
*Assistant Examiner* — Matthew Kwan
(74) *Attorney, Agent, or Firm* — Sughrue Mion, PLLC

(57) ABSTRACT

Provided are a method and an apparatus for predicting a chrominance signal from a luminance signal by using a correlation between the luminance and chrominance signals. A method of predicting a chrominance component image generates a down-sampled luminance signal matching a chrominance signal by independently applying various down-sampling methods according to a location of a luminance signal, and predicts a chrominance signal from the down-sampled luminance signal, while considering a size of a luminance prediction unit and a size of a chrominance prediction unit corresponding to each other according to a color format.

8 Claims, 18 Drawing Sheets

(51) Int. Cl.
  *H04N 19/182* (2014.01)
  *H04N 19/50* (2014.01)
  *H04N 19/59* (2014.01)
  *H04N 19/593* (2014.01)
(52) U.S. Cl.
  CPC .......... *H04N 19/186* (2014.11); *H04N 19/59* (2014.11); *H04N 19/593* (2014.11)
(58) Field of Classification Search
  USPC .................................................. 375/240.12
  See application file for complete search history.

(56) References Cited

U.S. PATENT DOCUMENTS

| | | | |
|---|---|---|---|
| 8,290,288 | B2 | 10/2012 | Lin et al. |
| 8,718,139 | B2 | 5/2014 | Yamada et al. |
| 2002/0097802 | A1 | 7/2002 | Lin et al. |
| 2008/0175490 | A1 | 7/2008 | Cho et al. |
| 2008/0219350 | A1 | 9/2008 | Guo et al. |
| 2010/0086029 | A1* | 4/2010 | Chen .................... H04N 19/176 375/240.12 |
| 2011/0211757 | A1 | 9/2011 | Kim et al. |
| 2011/0255591 | A1 | 10/2011 | Kim et al. |
| 2012/0287995 | A1* | 11/2012 | Budagavi ............... H04N 19/11 375/240.12 |
| 2013/0106998 | A1* | 5/2013 | Pahalawatta ....... H04N 13/0029 348/43 |

FOREIGN PATENT DOCUMENTS

| | | |
|---|---|---|
| CN | 101902653 A | 12/2010 |
| EP | 2624568 A2 | 8/2013 |
| JP | 2004-56786 A | 2/2004 |
| KR | 10-2006-0079051 A | 7/2006 |
| KR | 10-2010-0095914 A | 9/2010 |
| RU | 2369039 C1 | 9/2009 |
| TW | I335183 B | 12/2010 |
| WO | 00/33583 A1 | 6/2000 |
| WO | 2011/043797 A2 | 4/2011 |
| WO | 2012/044126 A2 | 4/2012 |

OTHER PUBLICATIONS

Communication dated Feb. 3, 2015 issued by the European Patent Office in counterpart European Patent Application No. 12804485.6.
Jianle Chen et al.; "CE6.A.4: Chroma intra prediction by reconstructed luma samples"; Joint Collaborative Team on Video Coding (JCT/VC) of ITU-T SG16 WP3 and ISO/IEC JTC1/SC29/WG11; Mar. 19, 2011; 11 pages total; http://phenix.it-sudparis.eu/jct/doc_end_user/documents/5_Geneva/wg11/JCTVC-E266-v4.zip; XP030048360.
Thomas Wiegand et al.; "WD3: Working Draft 3 of High-Efficiency Video Coding"; Joint Collaborative Team on Video Coding (JCT-VC) of ITU-T SG16 WP3 and ISO/IEC JTC1/SC29/WG11; Jun. 27, 2011; 9 pages total; http://phenix.int-evry.fr/jct/doc_end_user/documents/5_Geneva/wg11/JCTVC-E603-v8.zip.
Jianle Chen et al.; "Chroma intra prediction by reconstructed luma samples"; Joint Collaborative Team on Video Coding (JCT-VC) of ITU-T SG16 WP3 and ISO/IEC JTC1/SC29/WG11; Oct. 2, 2010; 7 pages total; http://wftp3.itu.int/av-arch/jctvc-site/; XP030007913.
Jianle Chen et al.; "Complexity reduction of chroma intra LM prediction mode"; Joint Collaborative Team on Video Coding (JCT-VC) of ITU-T SG16 WP3 and ISO/IEC JTC1/SC29/WG11; Jul. 1, 2011; 6 pages total; http://wftp3.itu.int/av-arch/jctvc-site/; XP030009517.
Sang Heon Lee et al.; "A New Intra Prediction Method Using Channel Correlations for the H.264/AVC Intra Coding"; Picture Coding Symposium 2009; May 6, 2009; 4 pages total; XP030081904.
Sang Heon Lee et al; "Intra Prediction Method Based on the Linear Relationship Between the Channels for YUV 4:2:0 Intra Coding"; Image Processing (ICIP); 2009 16th IEEE International Conference; Nov. 7, 2009; pp. 1037-1040; XP031628426; doi: 10.1109/ICIP.2009.5413727.
Jungsun Kim et al; "New intra chroma prediction using inter-channel correlation"; Joint Collaborative Team on Video Coding (JCT-VC) of ITU-T SG16 WP3 and ISO/IEC JTC1/SC29/WG11; Jul. 23, 2010; 9 pages total; http://wftp3.itu.int/av-arch/jctvc-site/; XP030007601.
Communication issued Jun. 24, 2016, issued by the State Intellectual property Office of the People's Republic of China in counterpart Chinese Patent Application No. 201280042364.5.
Communication issued Jun. 28, 2016, issued by the Taiwan Intellectual Property Office in counterpart Taiwanese Patent Application No. 101123373.
Communication issued Jul. 14, 2016, issued by the Federal Service for Intellectual Property in counterpart Russian Patent Application No. 2014102591.
Communication issued Feb. 5, 2016, issued by the Australian Intellectual Property Office in counterpart Australian Patent Application No. 2012276410.
International Search Report (PCT/ISA/210) dated Dec. 26, 2013, issued in International Application No. PCT/KR2012/005151.
Written Opinion (PCT/ISA/237) dated Dec. 26, 2012, issued in International Application No. PCT/KR2012/005151.
Communication dated Dec. 13, 2016, issued by the Indonesian Patent Office in counterpart Indonesian application No. P-00201400493.

* cited by examiner

CODING UNIT (1010)

PREDICTION UNIT (1060)

4:2:0 FORMAT

4:4:2 FORMAT

4:4:4 FORMAT

| $[A_2 >> r_{A2}]$ | $\dfrac{2^{n_{table}}}{[A_2 >> r_{A2}]}$ |
|---|---|
| 000000 | xxx |
| 000001 | xxx |
| ⋮ | ⋮ |
| 111111 | xxx |

64 {rows}

PREDICTION METHOD AND APPARATUS FOR CHROMA COMPONENT OF IMAGE USING LUMA COMPONENT OF IMAGE

CROSS-REFERENCE TO RELATED APPLICATIONS

This application is a National Stage application under 35 U.S.C. §371 of PCT/KR2012/005151, filed on Jun. 28, 2012, which claims the benefit of U.S. Provisional Application No. 61/501,985, filed on Jun. 28, 2011, all the disclosures of which are incorporated herein in their entireties by reference.

BACKGROUND

1. Field

Apparatuses and methods consistent with exemplary embodiments relate to intra predicting an image, and more particularly, to predicting a chrominance signal from a previously restored luminance signal by using a correlation between a luminance signal and a chrominance signal.

2. Description of the Related Art

In an image compression method, such as Moving Picture Experts Group (MPEG)-1, MPEG-2, MPEG-4, or H.264/MPEG-4 Advanced Video Coding (AVC), an image is divided into blocks having a predetermined size to encode the image. Then, each block is prediction encoded by using inter prediction or intra prediction.

A residual block is generated by subtracting a prediction block generated via inter prediction or intra prediction from an original block, and the generated residual block is discrete cosine transformed, quantized, and entropy encoded to generate a bitstream.

Alternatively, one pixel is expressed in a luminance component and a chrominance component, and then the luminance and chrominance components are each encoded and decoded.

SUMMARY

Aspects of one or more exemplary embodiments provide a method and apparatus for down-sampling a luminance block and predicting a chrominance block corresponding to the luminance block by using the down-sampled luminance block, by considering a size difference of the luminance and chrominance blocks according to a color format.

According to aspects of one or more exemplary embodiments, a luminance signal is down-sampled and a correlation between the down-sampled luminance signal and a chrominance signal is obtained, and the chrominance signal is predicted by using a previously restored luminance signal.

According to aspects of one or more exemplary embodiments, prediction efficiency may be improved by using a correlation between a luminance signal and a chrominance signal.

Also, according to aspects of one or more exemplary embodiments, throughput for prediction may be decreased while improving an operation speed by obtaining a parameter for defining a linear relationship between a luminance signal and a chrominance signal without having to perform a division operation.

Furthermore, according to aspects of one or more exemplary embodiments, overflow that may be generated while obtaining a parameter may be prevented while maintaining data accuracy.

According to an aspect of an exemplary embodiment, there is provided a method of predicting a chrominance component image by using a luminance component image, the method including: down-sampling inner pixels of a luminance prediction unit that has been pre-encoded and pre-restored and adjacent pixels of the luminance prediction unit, considering a size of a luminance prediction unit and a size of a chrominance prediction unit corresponding to each other according to a color format; obtaining parameters indicating a correlation between the luminance prediction unit and a predicted chrominance prediction unit based on the down-sampled adjacent pixels of the luminance prediction unit and restored adjacent pixels of the predicted chrominance prediction unit; and obtaining a prediction value of a chrominance prediction unit corresponding to the down-sampled luminance prediction unit, from the down-sampled luminance prediction unit by using the obtained parameters, wherein the down-sampling comprises: selecting a first location of a luminance pixel to be selected from a predetermined luminance pixel group or a first filtering method of luminance pixels, for down-sampling with respect to the inner pixels of the luminance prediction unit; selecting a second location of a luminance pixel to be selected from the predetermined luminance pixel group or a second filtering method of luminance pixels, for down-sampling with respect to adjacent upper pixels of the luminance prediction unit; and selecting a third location of a luminance pixel to be selected from the predetermined luminance pixel group or a third filtering method of luminance pixels, for down-sampling with respect to adjacent left pixels of the luminance prediction unit.

According to an aspect of another exemplary embodiment, there is provided an apparatus for predicting a chrominance component image by using a luminance component image, the apparatus including: a sampler configured to down-sample inner pixels of a luminance prediction unit that has been pre-encoded and pre-restored and adjacent pixels of the luminance prediction unit, considering a size of a luminance prediction unit and a size of a chrominance prediction unit corresponding to each other according to a color format; a parameter obtainer configured to obtain parameters indicating a correlation between the luminance prediction unit and a predicted chrominance prediction unit based on the down-sampled adjacent pixels of the luminance prediction unit and restored adjacent pixels of the predicted chrominance prediction unit; and a prediction performer configured to obtain a prediction value of a chrominance prediction unit corresponding to the down-sampled luminance prediction unit, from the down-sampled luminance prediction unit by using the obtained parameters, wherein the sampler selects a first location of a luminance pixel to be selected from a predetermined luminance pixel group or a first filtering method of luminance pixels, for down-sampling with respect to the inner pixels of the luminance prediction unit, selects a second location of a luminance pixel to be selected from the predetermined luminance pixel group or a second filtering method of luminance pixels, for down-sampling with respect to adjacent upper pixels of the luminance prediction unit, and selects a third location of a luminance pixel to be selected from the predetermined luminance pixel group or a third filtering method of luminance pixels, for down-sampling with respect to adjacent left pixels of the luminance prediction unit.

DETAILED DESCRIPTION OF EXEMPLARY EMBODIMENTS

Figure 1:
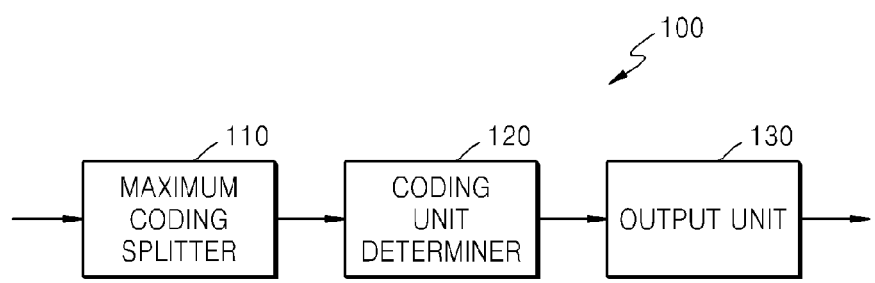
FIG. 1 is a block diagram of an apparatus for encoding a video, according to an exemplary embodiment.

Hereinafter, exemplary embodiments will be described more fully with reference to the accompanying drawings, in which like reference numerals refer to like elements throughout.

FIG. 1 is a block diagram of a video encoding apparatus 100, according to an exemplary embodiment.

The video encoding apparatus 100 includes a maximum coding unit splitter 110, a coding unit determiner 120, and an output unit 130 (e.g., outputter).

The maximum coding unit splitter 110 may split a current picture based on a maximum coding unit for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and length in squares of 2. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth deepens, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to same depth in one maximum coding unit, it is determined whether to split each of the coding units corresponding to the same depth to a lower depth by measuring an encoding error of the image data of the each coding unit, separately. Accordingly, even when image data is included in one maximum coding unit, the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splitting times from a maximum coding unit to a minimum coding unit. A first maximum depth according to an exemplary embodiment may denote the total number of splitting times from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation will now be referred to as a 'transformation unit'. Similarly to the coding unit, the transformation unit in the coding unit may be recursively split into smaller sized regions, so that the transformation unit may be determined independently in units of regions. Thus, residual data in the coding unit may be divided according to the transformation unit having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is thus N×N, and may be 2 when the size of the transformation unit is thus N/2×N/2. In other words, the transformation unit having the tree structure may be set according to the transformation depths.

Encoding information according to coding units corresponding to a coded depth includes not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in a maximum coding unit and a method of determining a partition, according to exemplary embodiments, will be described in detail later with reference to FIGS. 3 through 12.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a square data unit obtained by splitting the minimum coding unit constituting the lowermost depth by 4. Alternatively, the minimum unit may be a maximum square data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into a header of a bitstream.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include maximum 4 of the coding unit of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

Figure 2:
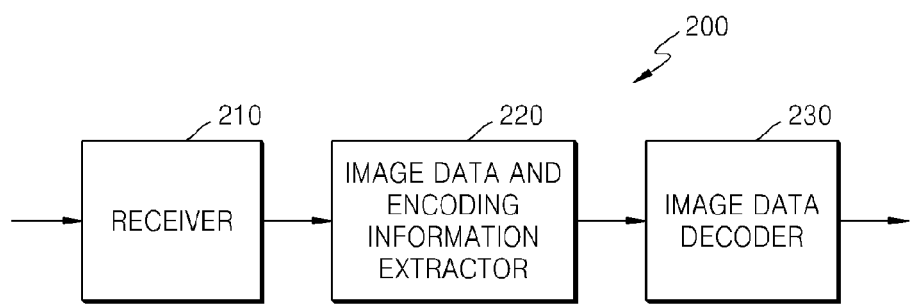
FIG. 2 is a block diagram of an apparatus for decoding a video, according to an exemplary embodiment.

FIG. 2 is a block diagram of a video decoding apparatus 200, according to an exemplary embodiment.

The video decoding apparatus 200 includes a receiver 210, an image data and encoding information extractor 220, and an image data decoder 230. Definitions of various terms, such as a coding unit, a depth, a prediction unit, a transformation unit, and information about various encoding modes, for various operations of the video decoding apparatus 200 are identical to those described with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. If information about a coded depth and encoding mode of a corresponding maximum coding unit is recorded according to predetermined data units, the predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse transformation according to each transformation unit in the coding unit, based on the information about the size of the transformation unit of the coding unit according to coded depths, so as to perform the inverse transformation according to maximum coding units.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to the each coded depth in the current maximum coding unit by using the information about the partition type of the prediction unit, the prediction mode, and the size of the transformation unit for each coding unit corresponding to the coded depth.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

A method of determining coding units having a tree structure, a prediction unit, and a transformation unit, according to an exemplary embodiment, will now be described with reference to FIGS. 3 through 13.

Figure 3:
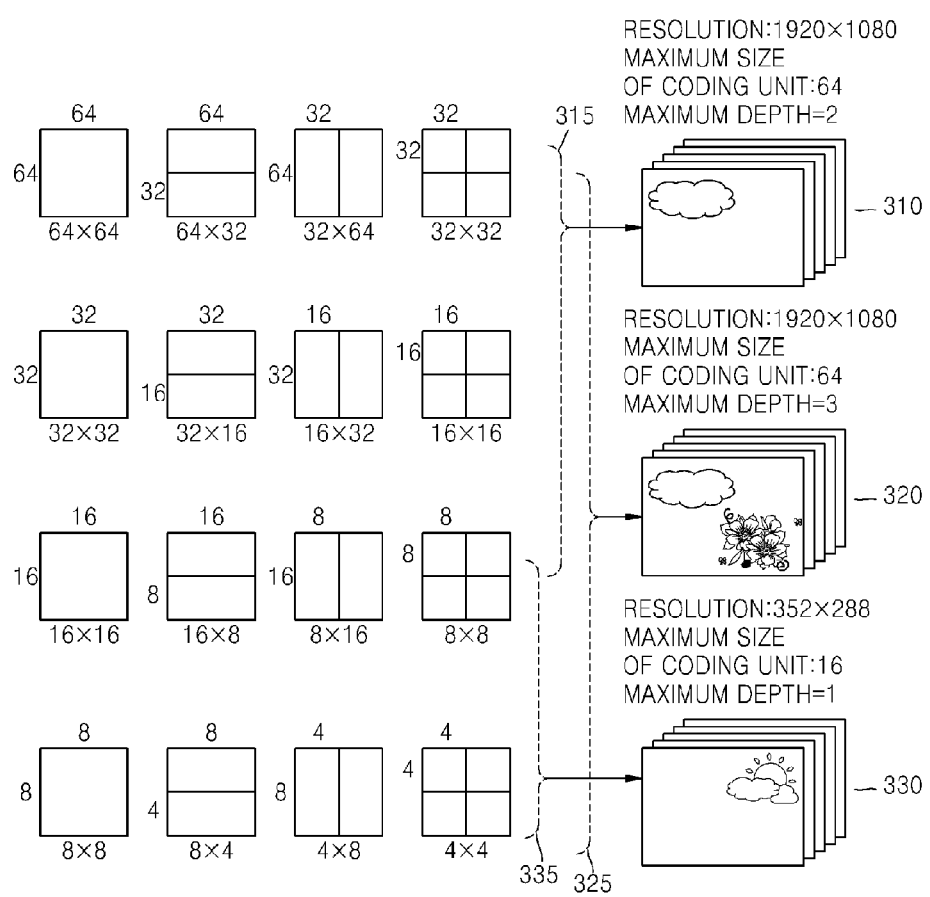
FIG. 3 is a diagram for describing a concept of coding units according to an exemplary embodiment.

FIG. 3 is a diagram for describing a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 4:
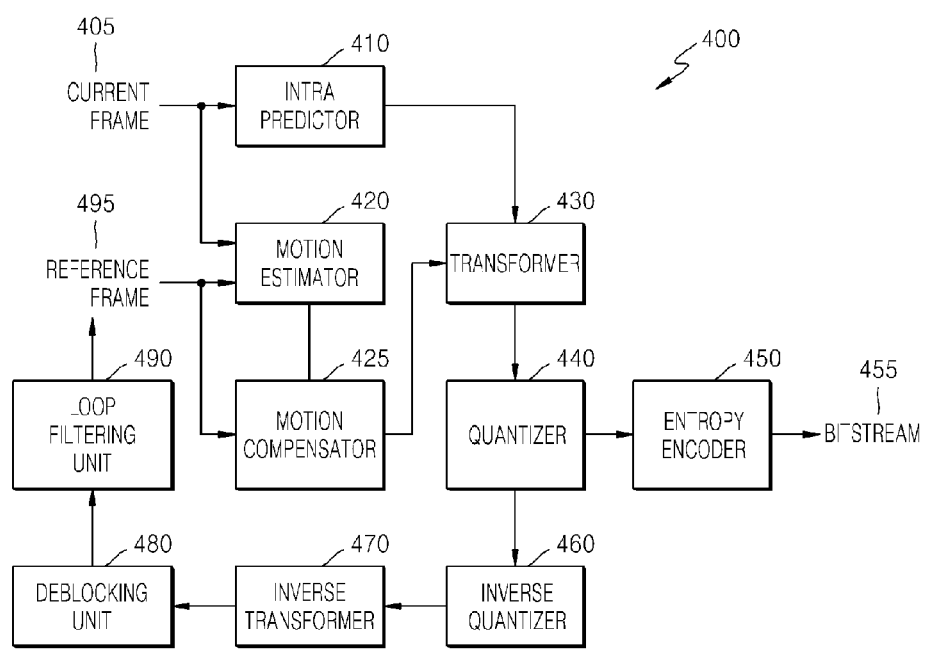
FIG. 4 is a block diagram of an image encoder based on coding units according to an exemplary embodiment.

FIG. 4 is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 5:
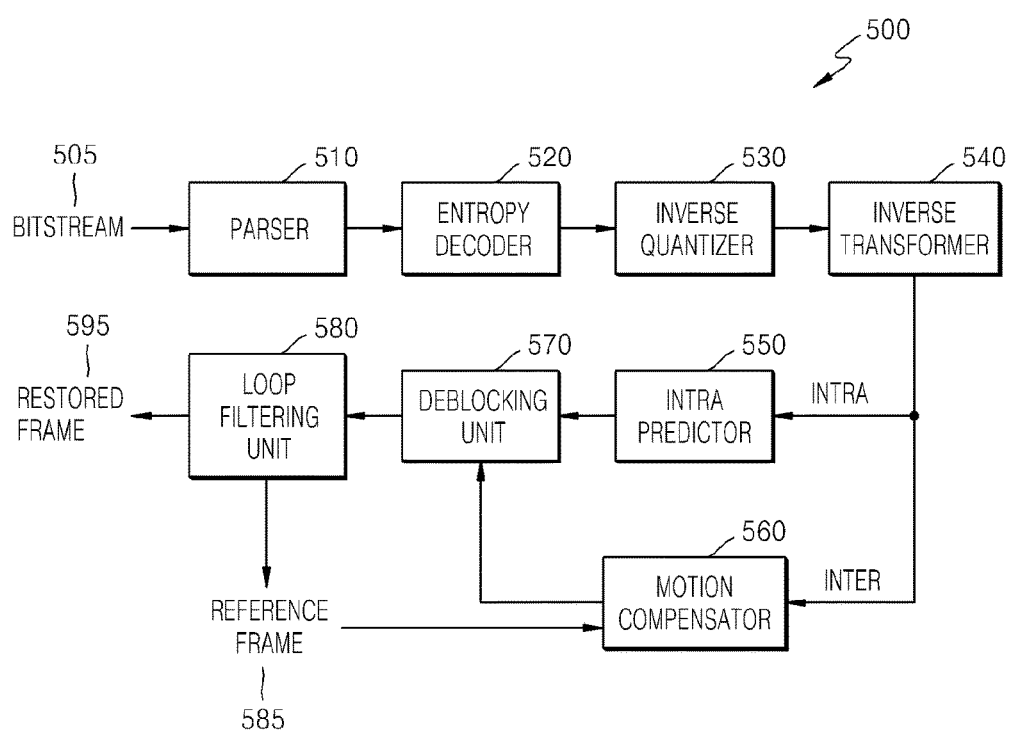
FIG. 5 is a block diagram of an image decoder based on coding units according to an exemplary embodiment.

FIG. 5 is a block diagram of an image decoder 500 based on coding units, according to an exemplary embodiment.

A parser 510 parses encoded image data to be decoded and information about encoding for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 (e.g., deblocker) and a loop filtering unit 580 (e.g., loop filterer). Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra prediction 550 and the motion compensator 560 perform operations based on partitions and a prediction mode for each of the coding units having a tree structure, and the inverse transformer 540 perform operations based on a size of a transformation unit for each coding unit.

Figure 6:
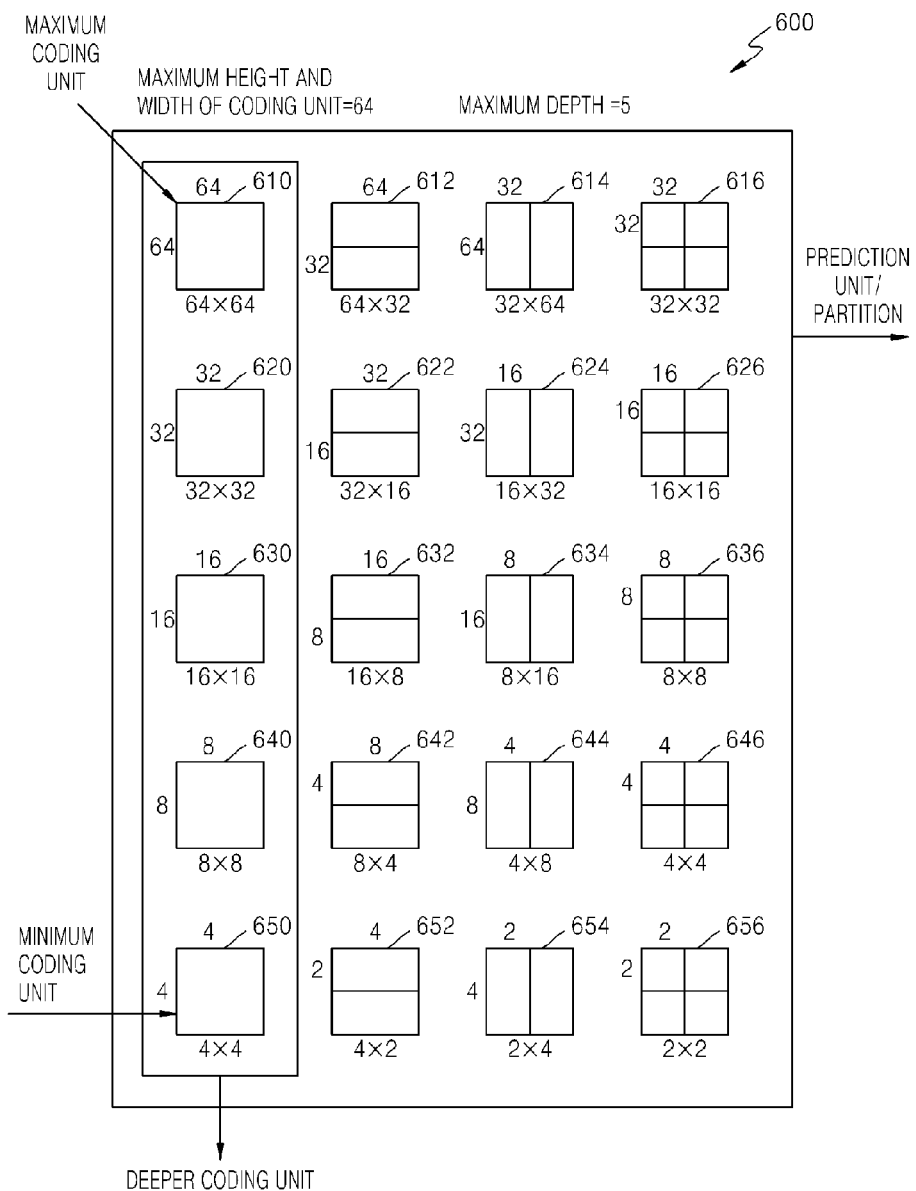
FIG. 6 is a diagram illustrating deeper coding units according to depths, and partitions according to an exemplary embodiment.

FIG. 6 is a diagram illustrating deeper coding units according to depths, and partitions, according to an exemplary embodiment.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions include in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 is only assigned to a partition having a size of 4×4.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are used to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

Figure 7:
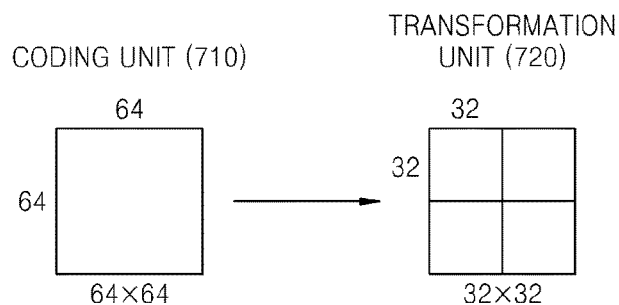
FIG. 7 is a diagram for describing a relationship between a coding unit and transformation units, according to an exemplary embodiment.

FIG. 7 is a diagram for describing a relationship between a coding unit 710 and transformation units 720, according to an exemplary embodiment.

The video encoding apparatus 100 or the video decoding apparatus 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 8:
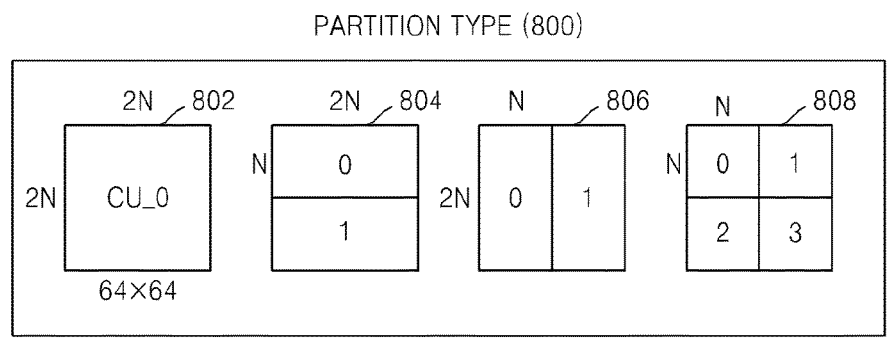
FIG. 8 is a diagram for describing encoding information of coding units corresponding to a coded depth, according to an exemplary embodiment.
Figure 8:
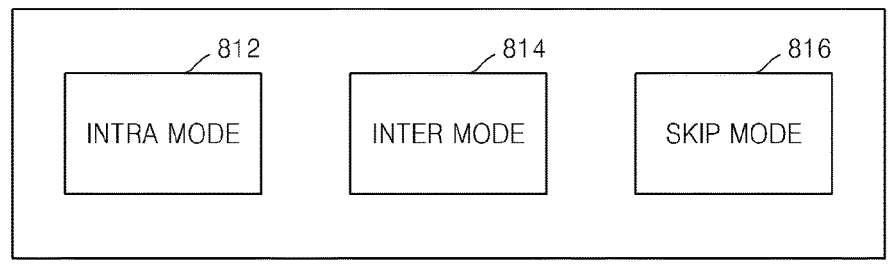
Figure 8:
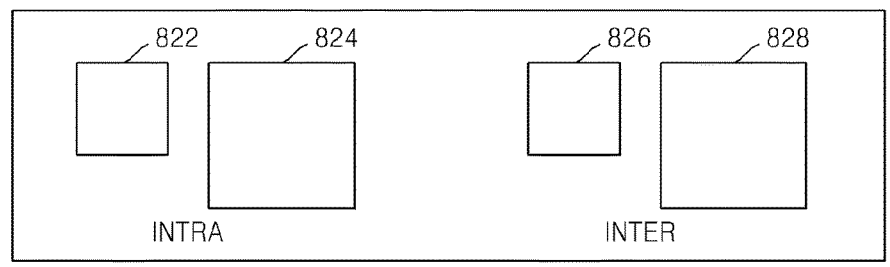

FIG. 8 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

The image data and encoding information extractor 220 of the video decoding apparatus 200 may extract and use the information 800, 810, and 820 for decoding, according to each deeper coding unit.

Figure 9:
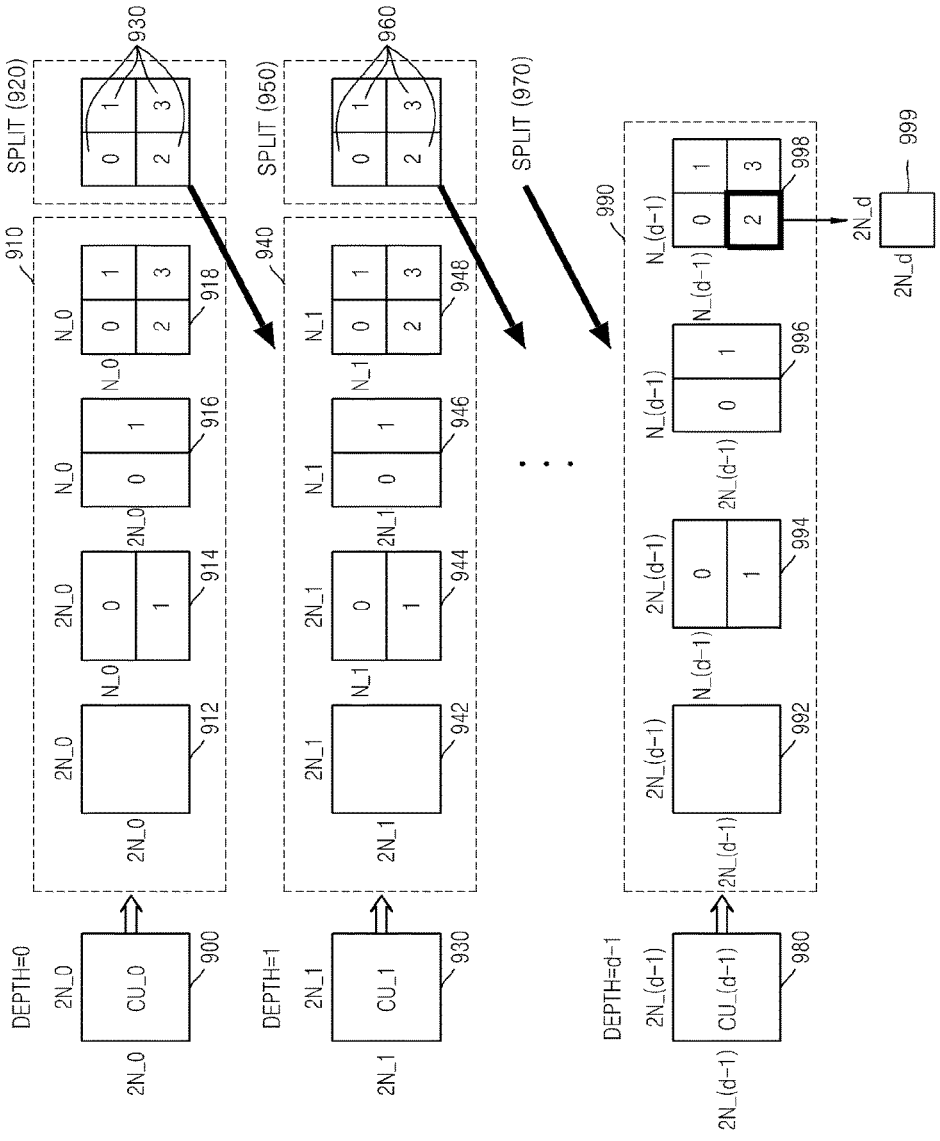
FIG. 9 is a diagram of deeper coding units according to depths, according to an exemplary embodiment.

FIG. 9 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of $2N\_0 \times 2N\_0$ may include partitions of a partition type 912 having a size of $2N\_0 \times 2N\_0$, a partition type 914 having a size of $2N\_0 \times N\_0$, a partition type 916 having a size of $N\_0 \times 2N\_0$, and a partition type 918 having a size of $N\_0 \times N\_0$. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of $2N\_0 \times 2N\_0$, two partitions having a size of $2N\_0 \times N\_0$, two partitions having a size of $N\_0 \times 2N\_0$, and four partitions having a size of $N\_0 \times N\_0$, according to each partition type. The prediction encoding in an intra mode and an inter mode may be performed on the partitions having the sizes of $2N\_0 \times 2N\_0$, $N\_0 \times 2N\_0$, $2N\_0 \times N\_0$, and $N\_0 \times N\_0$. The prediction encoding in a skip mode is performed only on the partition having the size of $2N\_0 \times 2N\_0$.

If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of $N\_0 \times N\_0$ to search for a minimum encoding error.

A prediction unit 940 for prediction encoding the coding unit 930 having a depth of 1 and a size of $2N\_1 \times 2N\_1$ ($=N\_0 \times N\_0$) may include partitions of a partition type 942 having a size of $2N\_1 \times 2N\_1$, a partition type 944 having a size of $2N\_1 \times N\_1$, a partition type 946 having a size of $N\_1 \times 2N\_1$, and a partition type 948 having a size of $N\_1 \times N\_1$.

If an encoding error is the smallest in the partition type 948, a depth is changed from 1 to 2 to split the partition type 948 in operation 950, and encoding is repeatedly performed on coding units 960, which have a depth of 2 and a size of $N\_2 \times N\_2$ to search for a minimum encoding error.

When a maximum depth is d, split operation according to each depth may be performed up to when a depth becomes d-1, and split information may be encoded as up to when a depth is one of 0 to d-2. In other words, when encoding is performed up to when the depth is d-1 after a coding unit corresponding to a depth of d-2 is split in operation 970, a prediction unit 990 for prediction encoding a coding unit 980 having a depth of d-1 and a size of $2N\_(d-1) \times 2N\_(d-1)$ may include partitions of a partition type 992 having a size of 2N_(d−1)×2N_(d-1), a partition type 994 having a size of 2N_(d-1)×N_(d-1), a partition type 996 having a size of N_(d-1)×2N_(d-1), and a partition type 998 having a size of N_(d-1)×N_(d -1).

Prediction encoding may be repeatedly performed on one partition having a size of 2N_(d-1)×2N_(d-1), two partitions having a size of 2N_(d-1)×N_(d-1), two partitions having a size of N_(d-1)×2N_(d-1), four partitions having a size of N_(d-1)×N_(d-1) from among the partition types 992 through 998 to search for a partition type having a minimum encoding error.

Even when the partition type 998 has the minimum encoding error, since a maximum depth is d, a coding unit CU_(d-1) having a depth of d-1 is no longer split to a lower depth, and a coded depth for the coding units constituting a current maximum coding unit 900 is determined to be d-1 and a partition type of the current maximum coding unit 900 may be determined to be N_(d-1)×N_(d-1). Also, since the maximum depth is d and a minimum coding unit 980 having a lowermost depth of d-1 is no longer split to a lower depth, split information for the minimum coding unit 980 is not set.

A data unit 999 may be a 'minimum unit' for the current maximum coding unit. A minimum unit according to an exemplary embodiment may be a square data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 10:
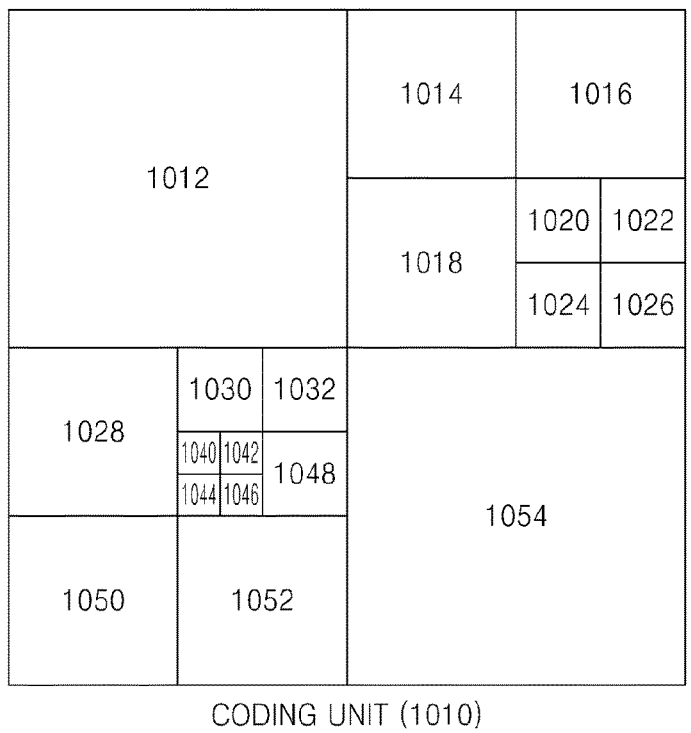
FIGS. 10 through 12 are diagrams for describing a relationship between coding units, prediction units, and transformation units, according to an exemplary embodiment.
Figure 11:
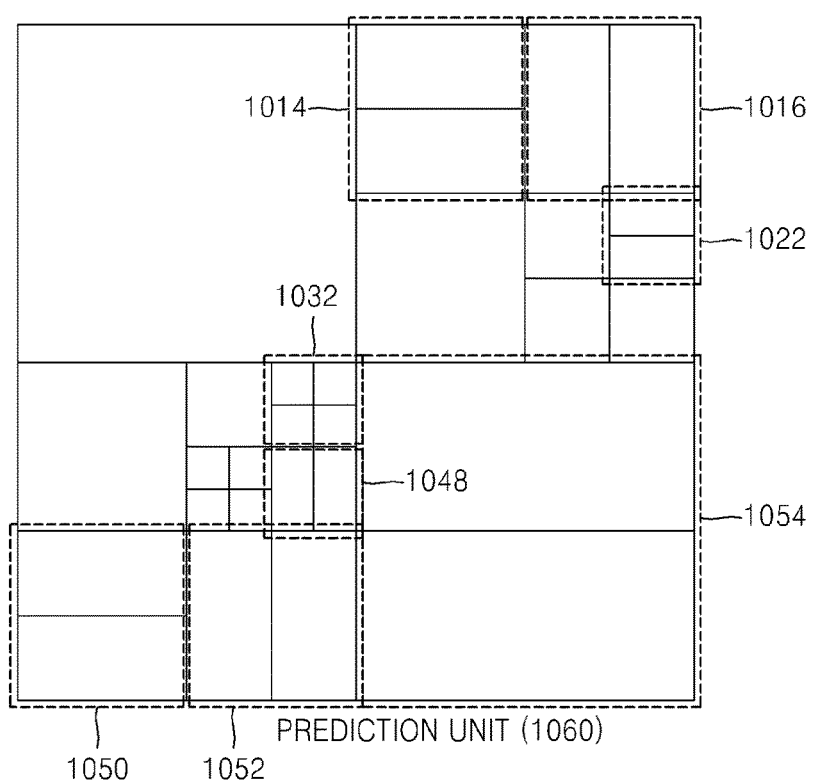
Figure 12:
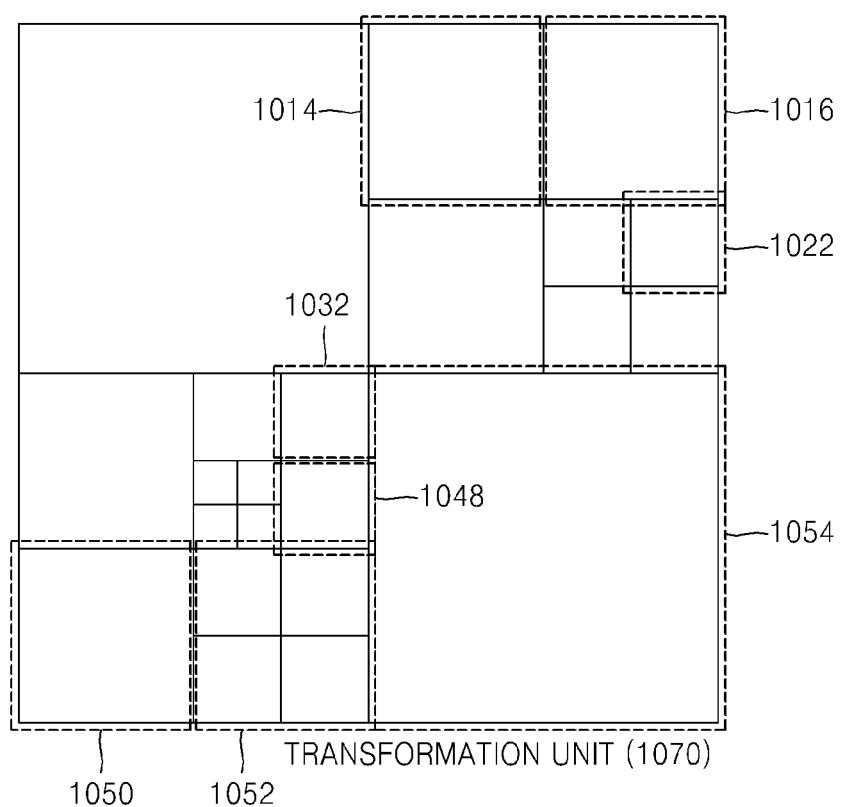

FIGS. 10 through 12 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | Repeatedly Encode Coding Units having Lower Depth of d + 1 |
| Intra Inter Skip (Only 2N × 2N) | Symmetrical Partition Type | Asymmetrical Partition Type | Split Information 0 of Transformation Unit | Split Information 1 of Transformation Unit | |
| | 2N × 2N 2N × N N × 2N N × N | 2N × nU 2N × nD nL × 2N nR × 2N | 2N × 2N | N × N (Symmetrical Type) N/2 × N/2 (Asymmetrical Type) | |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 13:
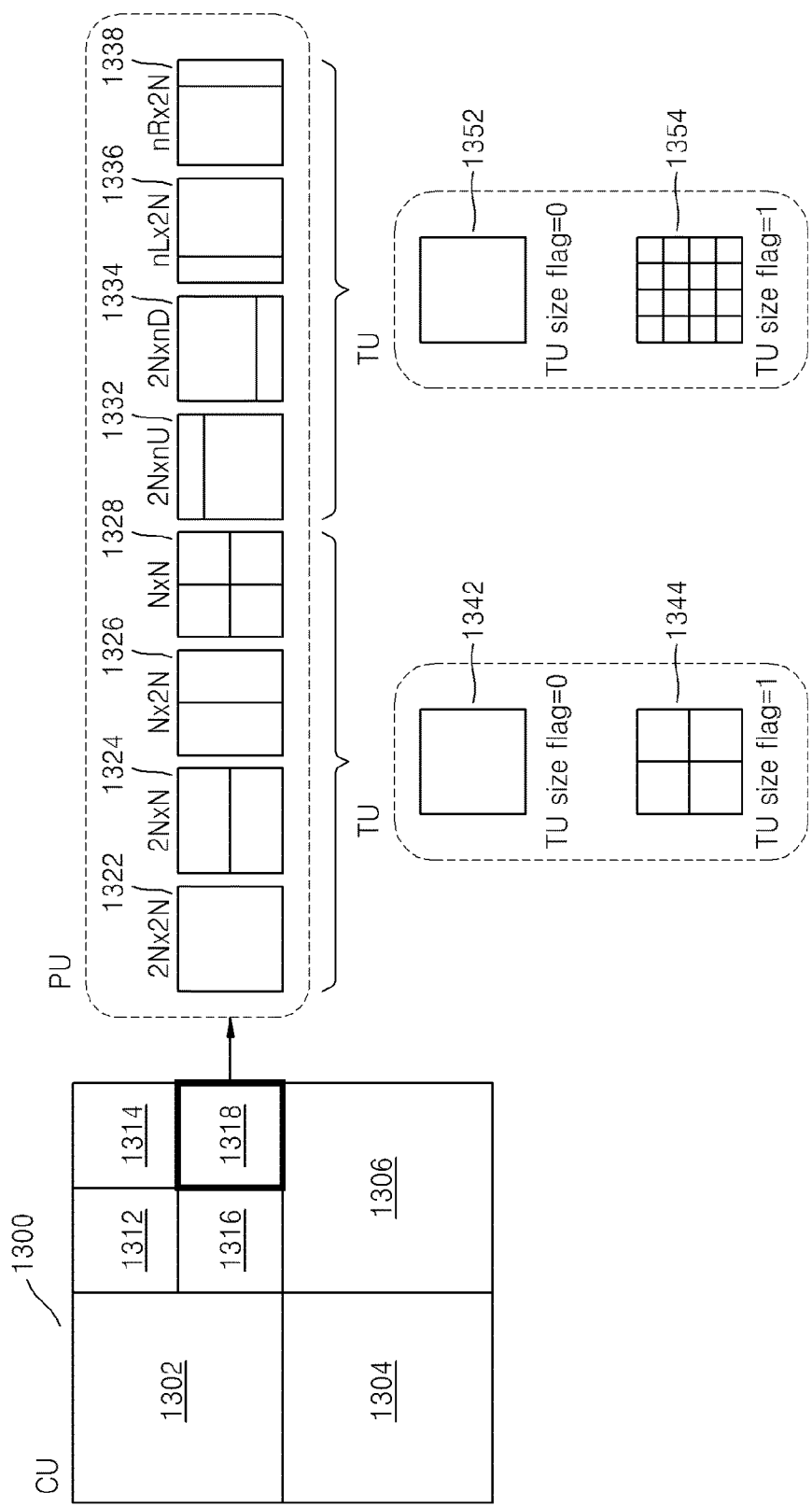
FIG. 13 is a diagram for describing a relationship between a coding unit, a prediction unit or a partition, and a transformation unit, according to encoding mode information of Table 1.

FIG. 13 is a diagram for describing a relationship between a coding unit, a prediction unit or a partition, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e. the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Hereinafter, prediction operations performed by the image encoder 400 of FIG. 4 and the image decoder 500 of FIG. 5 will be described in detail. A process of predicting a chrominance component prediction unit from a luminance component prediction unit, according to an exemplary embodiment, may be performed by the intra predictor 410 of FIG. 4 and the intra predictor 550 of FIG. 5 in a new intra prediction mode. An intra prediction mode predicting a chrominance component prediction unit from a luminance component prediction unit may be referred to as an Intra_FromLuma mode.

Generally, a color video signal uses at least three color components per pixel to express a color. A color space includes various types, such as an RGB color space where each sample of a color video signal is indicated through three pixel values showing relative ratios of red, green, and blue, and a YCbCr color space and YUV color space where a luminance component and a chrominance component are separated from each other in a color video signal considering that a human visual system (HVS) is more sensitive to the luminance component than the chrominance component. General video encoding/decoding methods encode and decode a video signal by dividing the video signal into a plurality of color components. In such a video signal including the plurality of color components, a uniform correlation may exist between the color components expressing the same pixel. For example, a value of a luminance component (Y) and values of chrominance components (Cb and Cr) of pixels in the same block may have similar patterns.

Accordingly, a predicting apparatus according to an exemplary embodiment obtains parameters indicating a linear correlation between a luminance signal and a chrominance signal by using encoded and restored adjacent luminance pixels and restored adjacent chrominance pixels before processing of a current chrominance prediction unit is performed, and generates a prediction value of the current chrominance prediction unit from the previously encoded and restored adjacent luminance pixel unit by using the obtained parameters. According to an exemplary embodiment, while considering a size difference between a luminance prediction unit and a chrominance prediction unit according to a color format, different down-sampling methods are applied to inner pixels, adjacent upper pixels, and adjacent left pixels of a luminance prediction unit to sample a luminance pixel corresponding to a chrominance pixel. An exemplary embodiment provides a method of effectively obtaining a parameter indicating a linear correlation between a luminance signal and a chrominance signal by preventing a division operation that is a burden to hardware and only using shift, multiplication, addition, subtraction operations and accessing a look-up table. Also, an exemplary embodiment provides a method of reducing throughput by pre-storing values required while obtaining parameters in a look-up table and obtaining the parameters by referring to the look-up table. Hereinafter, a pixel of a corresponding chrominance component is predicted from a pixel of a luminance component, but it would be obvious to one of ordinary skill in the art that exemplary embodiments may be applied to other color spaces, such as an RGB color space, instead of a YCbCr color space.

Figure 14:
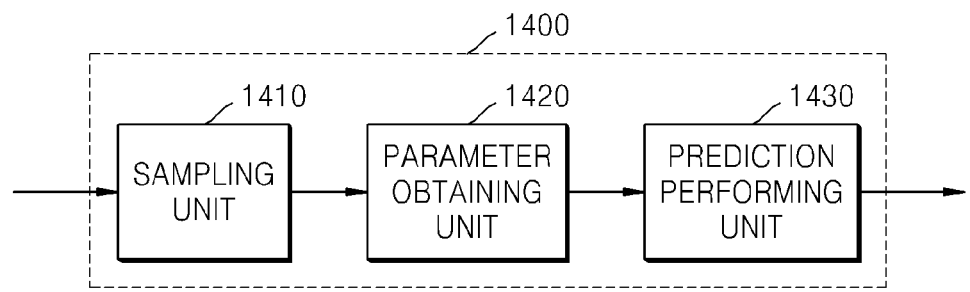
FIG. 14 is a block diagram of an intra predicting apparatus according to an exemplary embodiment.

FIG. 14 is a block diagram of an intra predicting apparatus 1400 according to an exemplary embodiment.

Referring to FIG. 14, the intra predicting apparatus 1400 includes a sampling unit 1410 (e.g., sampler), a parameter obtaining unit 1420 (e.g., parameter obtainer), and a prediction performing unit 1430 (e.g., prediction performer).

When a size of a luminance prediction unit is larger than a size of a chrominance prediction unit, the sampling unit 1410 down-samples a luminance signal such that the size of the luminance prediction unit and the size of the chrominance prediction unit are the same by down-sampling pixels and adjacent pixels of a restored luminance prediction unit. A process of down-sampling a luminance signal will be described in detail later. Hereinafter, a pixel of a luminance component is referred to as a luminance pixel and a pixel of a chrominance component is referred to as a chrominance pixel.

The parameter obtaining unit 1420 obtains parameters indicating a correlation between the chrominance prediction unit and the luminance prediction unit based on restored adjacent pixels of the chrominance prediction unit and restored adjacent pixels of the luminance prediction unit corresponding to the chrominance prediction unit. Specifically, the parameter obtaining unit 1410 performs a scaling operation of changing a bit depth so as to prevent an overflow generated while calculating a size of a look-up table and obtaining parameters. Detailed operations of the parameter obtaining unit 1410 will be described later.

The prediction performing unit 1430 predicts a corresponding chrominance pixel from a restored luminance pixel by using the obtained parameters.

Figure 15A:
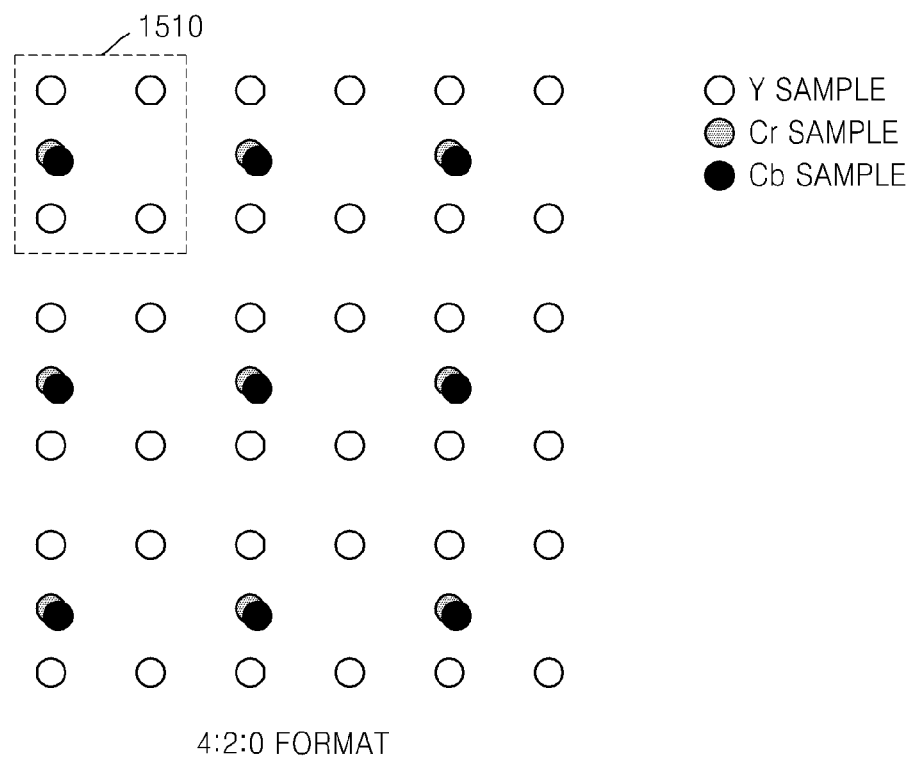
FIGS. 15A through 15C are reference diagrams of a color format.
Figure 15B:
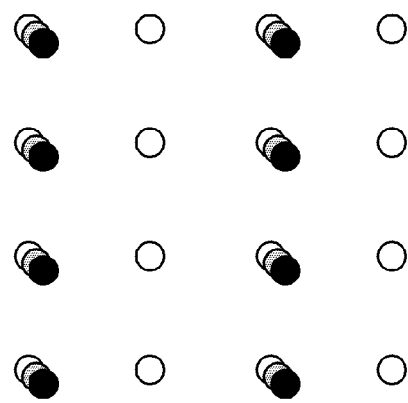
Figure 15C:
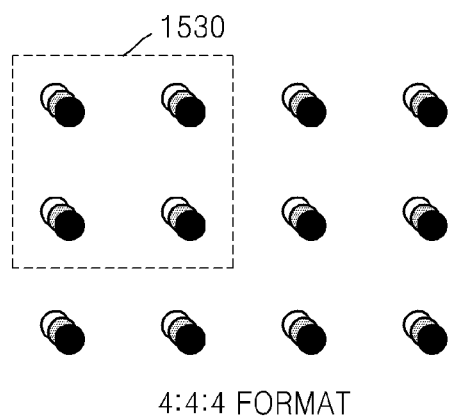
Figure 16A:
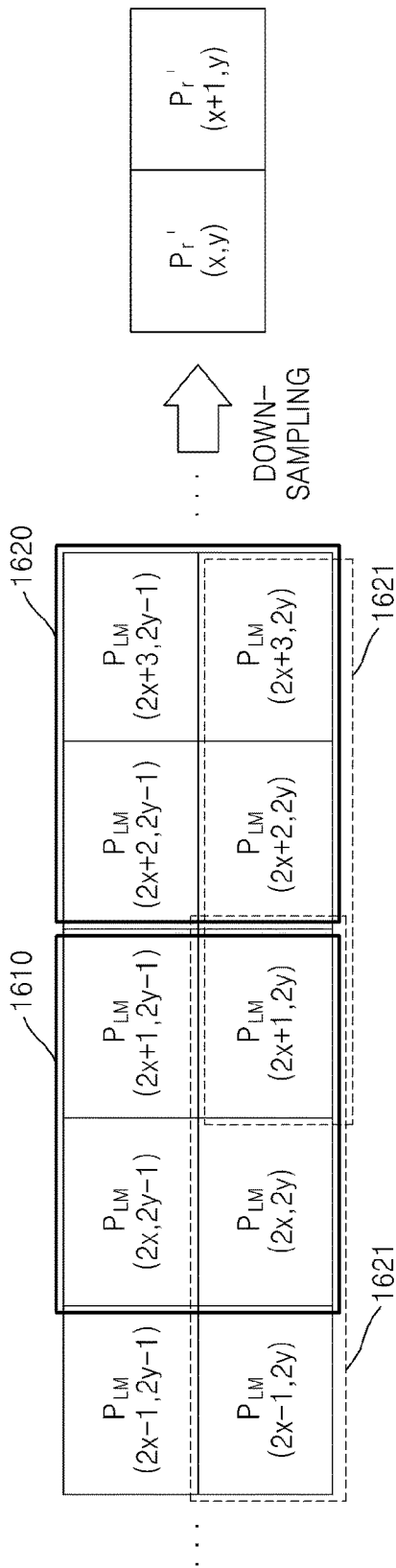
FIGS. 16A and 16B are reference diagrams of a luminance prediction unit and a chrominance prediction unit according to a color format.
Figure 16B:
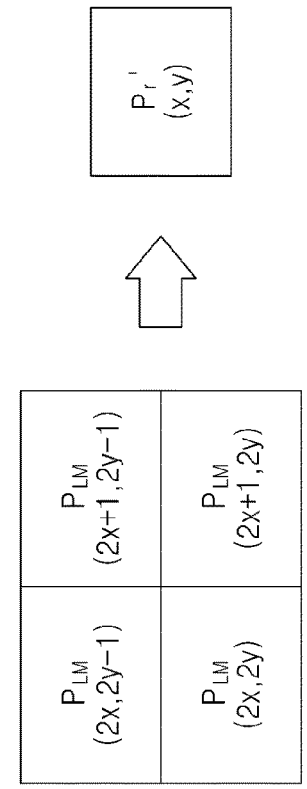

FIGS. 15A through 15C are reference diagrams of a color format including a plurality of color components, and FIGS. 16A and 16B are reference diagrams of a luminance prediction unit and a chrominance prediction unit according to a color format.

Each number in a 4:2:0 color format, a 4:2:2 color format, and a 4:4:4 color format respectively of FIGS. 15A through 15C shows a relative sampling ratio in a horizontal direction. For example, in the 4:4:4 color format, four Cb chrominance pixels and four Cr chrominance pixels exist with respect to four Y luminance pixels 1530. Referring to FIG. 16A, when a size of a Y luminance prediction unit is 2N×2M in the 4:4:4 color format, wherein N and M are integers, Cb and Cr chrominance prediction units corresponding to the Y luminance prediction unit also have a size of 2N×2M. In the 4:2:2 color format, Cb and Cr chrominance components have the same resolution as a Y luminance component in a vertical direction, but have half the resolution of the Y luminance component in a horizontal direction. In other words, in the 4:2:2 color format, two Cb chrominance pixels and two Cr chrominance pixels exist per four Y luminance pixels 1510 in a horizontal direction. Also, in the 4:2:0 color format, Cb and Cr chrominance components have half resolution of a Y luminance component in horizontal and vertical directions. In other words, the Cb and Cr chrominance components have ¼ pixels compared to a number of pixels of the Y luminance component, and as shown in FIG. 16B, corresponding Cb and Cr chrominance prediction units have a size of N×M, which is ½ resolution in horizontal and vertical directions, compared to Y luminance prediction unit having a size of 2N×2M in the 4:2:0 color format.

Accordingly, when a luminance prediction unit is larger than a chrominance prediction unit as in the 4:2:2 or 4:2:0 color format, the sampling unit 1410 down-samples a restored luminance prediction unit and adjacent pixels of the restored luminance prediction unit such that a luminance signal and a chrominance signal match 1:1.

Specifically, the sampling unit 1410 according to an exemplary embodiment performs down-sampling by applying an independent down-sampling method on inner pixels of a luminance prediction unit, adjacent upper pixels of the luminance prediction unit, and adjacent left pixels of the luminance prediction unit, respectively. Examples of the down-sampling method include a method of selecting one pixel from a luminance pixel group having a predetermined size, for example, a 2×2 luminance pixel group and a method of independently determining a filtering direction (horizontal or vertical direction), a number of filter taps, and a filter coefficient for luminance pixels in a predetermined luminance pixel group and performing filtering to select one filtered luminance pixel as a down-sampled pixel. As such, the sampling unit 1410 down-samples a luminance pixel so as to match a chrominance pixel 1:1 by using one of various down-sampling methods, such as a down-sampling method using an average value (2-tap filter) of a plurality of adjacent luminance pixels on a line in a predetermined direction selected from a luminance pixel group having a predetermined size, a down-sampling method using a weighted average value (n-tap filter) of a plurality of adjacent luminance pixels in a predetermined direction selected from a luminance pixel group having a predetermined size, and a down-sampling method selecting a luminance pixel in a predetermined location in a luminance pixel group having a predetermined size. For example, the sampling unit 1410 selects a first location of a luminance pixel to be selected from a predetermined luminance pixel group or a first filtering method of luminance pixels for down-sampling of inner pixels of a luminance prediction unit, selects a second location of a luminance pixel to be selected from the predetermined luminance pixel group or a second filtering method of the luminance pixels for down-sampling of adjacent upper pixels of the luminance prediction unit, and selects a third location of a luminance pixel to be selected from the predetermined luminance pixel group or a third filtering method of the luminance pixels for down-sampling of adjacent left pixels of the luminance prediction unit. Here, the first location and the first filtering method used for down-sampling of the inner pixels of the luminance prediction unit, the second location and the second filtering method for down-sampling of the adjacent upper pixels of the luminance prediction unit, and the third location and the third filtering method for down-sampling of the adjacent left pixels of the luminance prediction unit are independently determined, and thus may be identical to or different from each other. Also, the sampling unit 1410 performs down-sampling by applying a filtering method independently on the inner pixels, adjacent upper pixels, and adjacent left pixels of the luminance prediction unit.

Hereinafter, various methods of down-sampling a luminance pixel according to exemplary embodiments will be described.

FIG. 16A is a reference diagram for describing a process of down-sampling a luminance signal, according to an exemplary embodiment.

Referring to FIG. 16A, the sampling unit 1410 may down-sample a luminance pixel group 1610 including four luminance pixels $P_{LM}(2x,2y)$, $P_{LM}(2x+1,2y)$, $P_{LM}(2x,2y-1)$, and $P(2x+1,2y-1)$ into one luminance pixel. In detail, the sampling unit 1410 obtains a down-sampled luminance pixel corresponding to a chrominance pixel at an (x,y) location, wherein x and y are each an integer, by calculating a weighted average value using three pixels, i.e., the luminance pixel $P_{LM}(2x,2y)$ located lower left in the luminance pixel group 1610 and the luminance pixels $P_{LM}(2x-1,2y)$ and $P_{LM}(2x+1,2y)$ located right and left of the luminance pixel $P_{LM}(2x,2y)$. For example, a down-sampled luminance pixel $p_r'(x,y)$ corresponding to a chrominance pixel at an (x,y) location may be obtained according to equation, $p_r'(x,y)=(P_{LM}(2x-1,2y)+2*P_{LM}(2x,2y)+P_{LM}(2x+1,2y)+2)>>2$.

Similarly, the sampling unit 1410 may down-sample a luminance pixel group 1620 including four luminance pixels $P_{LM}(2x+2,2y)$, $P_{LM}(2x+3,2y)$, $P_{LM}(2x+2,2y-1)$, and $P(2x+3,2y-1)$ into one luminance pixel. In detail, the sampling unit 1410 obtains a down-sampled luminance pixel corresponding to a chrominance pixel at an (x,y) location, wherein x and y are each an integer, by calculating a weighted average value using three luminance pixels, i.e., the luminance pixel $P_{LM}(2x+2,2y)$ located lower left in the luminance pixel group 1620 and luminance pixels $P_{LM}(2x+1,2y)$ and $P_{LM}(2x+3,2y)$ located left and right of the luminance pixel $P_{LM}(2x+2,2y)$. For example, a down-sampled luminance pixel $p_r'(x+1,y)$ corresponding to a chrominance pixel at an (x+1,y) location may be obtained according to equation, $p_r'(x+1,y)=(P_{LM}(2x+1,2y)+2*P_{LM}(2x+2,2y)+P_{LM}(2x+3,2y)+2)>>2$.

In the above exemplary embodiments, the sampling unit 1410 performs down-sampling by calculating a weighted average value by setting a weight of 2 to a center luminance pixel and a weight of 1 to each of luminance pixels to the left and right of the center luminance pixel, but such weights may vary, and locations and numbers of center luminance pixel and adjacent pixels used to calculate a weighted average value may be changed.

FIG. 16B is a reference diagram for describing a process of down-sampling of a luminance signal, according to another exemplary embodiment.

Referring to FIG. 16B, the sampling unit 1410 may obtain a down-sampled luminance pixel $p_r'(x,y)$ corresponding to a chrominance pixel at an (x,y) location, wherein x and y are each an integer, by using an average value of luminance pixels on a line in a predetermined direction selected from four luminance pixels $P_{LM}(2x,2y)$, $P_{LM}(2x+1,2y)$, $P_{LM}(2x,2y-1)$, and $P(2x+1,2y-1)$, or by selecting a luminance pixel at a predetermined location.

In detail, the sampling unit 1410 may obtain the down-sampled luminance pixel $p_r'(x,y)$ by selecting one luminance pixel at a predetermined location from among the four luminance pixels $P_{LM}(2x,2y)$, $P_{LM}(2x+1,2y)$, $P_{LM}(2x,2y-1)$, and $P(2x+1,2y-1)$. Alternatively, the sampling unit 1410 may determine an average value of the luminance pixels $P_{LM}(2x,2y)$ and $P_{LM}(2x+1,2y)$ or the luminance pixel $P_{LM}(2x,2y-1)$ and $P(2x+1,2y-1)$, which are adjacent in a horizontal direction, as the down-sampled luminance pixel $p_r'(x,y)$. Alternatively, the sampling unit 1410 may determine an average value of the luminance pixels $P_{LM}(2x,2y)$ and $P_{LM}(2x,2y-1)$ or luminance pixels $P_{LM}(2x+1,2y)$ and $P(2x+1,2y-1)$, which are adjacent in a vertical direction, as the down-sampled luminance pixel $p_r'(x,y)$.

The sampling unit 1410 performs down-sampling such that a luminance pixel and a chrominance pixel match 1:1 by differently applying various down-sampling methods according to a location of a luminance pixel.

Figure 17A:
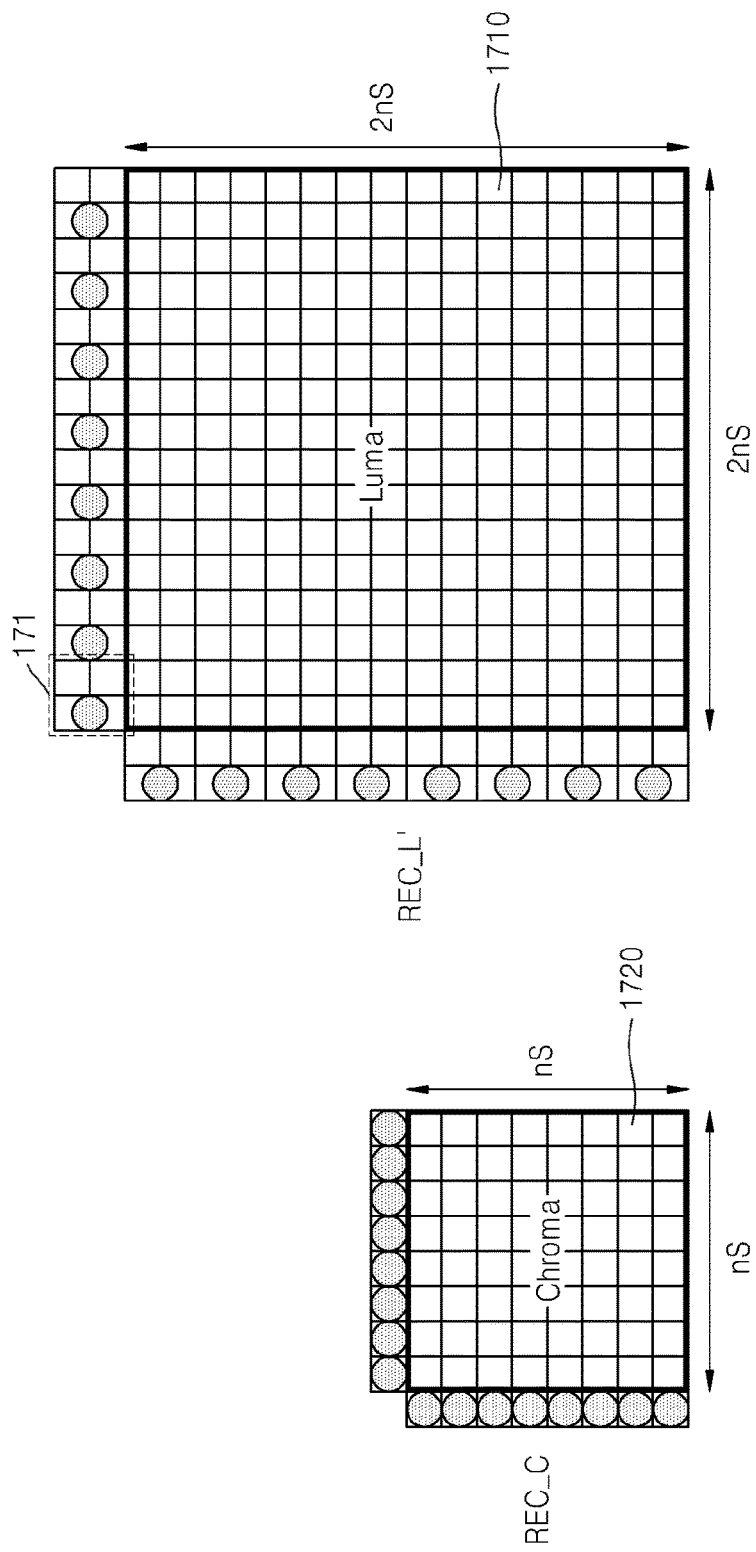
FIGS. 17A through 17C are diagrams for describing a process of performing down-sampling according to a location of a luminance pixel, according to exemplary embodiments.
Figure 17B:
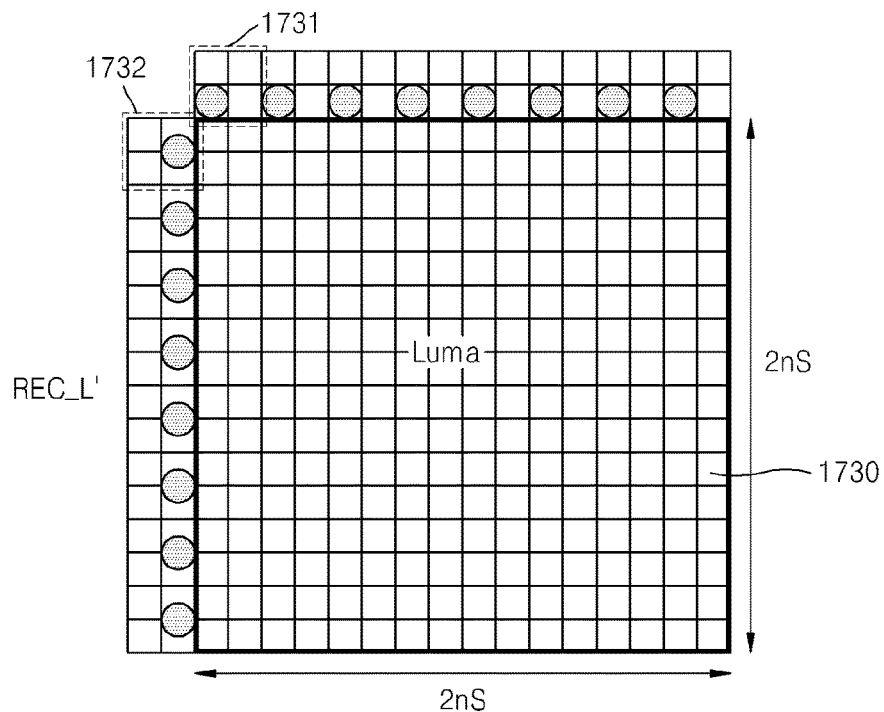
Figure 17C:
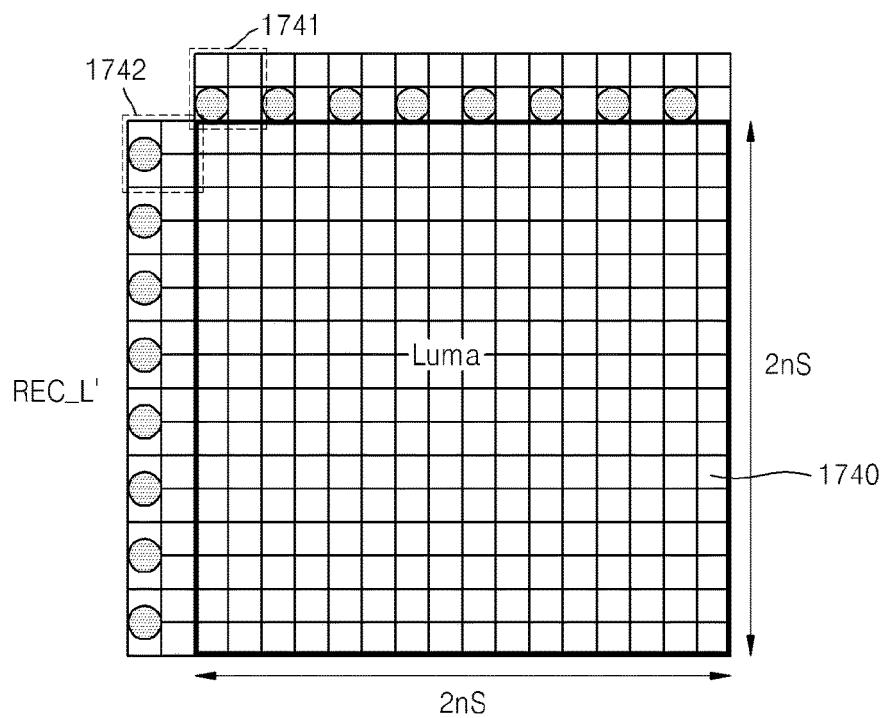

FIGS. 17A through 17C are diagrams for describing a process of performing down-sampling according to a location of a luminance pixel, according to exemplary embodiments.

Referring to FIG. 17A, when a size of a luminance prediction unit 1710 is 2nS×2nS and a size of a chrominance prediction unit 1720 is nS×nS, wherein nS is a positive integer, the sampling unit 1410 performs down-sampling on the luminance prediction unit 1710 and adjacent pixels so that a down-sampled luminance prediction unit and down-sampled adjacent pixels match the chrominance prediction unit 1720 and adjacent pixels.

In detail, when RecL(x,y) (x and y are from 0 to 2nS-1) denotes an inner luminance pixel of the luminance prediction unit 1710, RecL(x,-1) (x is from 0 to 2nS-1) denotes an upper luminance pixel of the luminance prediction unit 1710, RecL(-1,y) (y is from 0 to 2nS-1) denotes a left luminance pixel of the luminance prediction unit 1710, and RecL'(x,y) denotes a down-sampled luminance pixel corresponding a chrominance pixel at an (x,y) location, the sampling unit 1410 may obtain a down-sampled luminance pixel RecL'(x,-1) corresponding to adjacent upper pixels Pc(x,-1) of a chrominance prediction unit 1720 according to equation, RecL'(x,-1)=(RecL(2x,-2)+RecL(2x,-1))>>1, with respect to adjacent upper pixels of the luminance prediction unit 1710. For example, the sampling unit 1410 may perform down-sampling by using average values of luminance pixels at locations (2x,-2) and (2x,-1) in luminance pixel groups 171 above the luminance prediction unit 1710.

Also, the sampling unit 1410 may obtain a down-sampled luminance pixel RecL'(-1,y) corresponding to adjacent left pixels Pc(-1,y) of the chrominance prediction unit 1720 according to equation, RecL'(-1,y)=(RecL(-2,2y)+RecL(-2,2y+1))>>1, with respect to adjacent left pixels of the luminance prediction unit 1710.

Also, the sampling unit 1410 may obtain a down-sampled luminance pixel RecL'(x,y) corresponding to inner pixels Pc(x,y) of the chrominance prediction unit 1720 according to equation, RecL'(x,y)=(RecL(2x,2y)+RecL(2x,2y+1))>>1, with respect to inner pixels of the luminance prediction unit 1710.

Referring to FIG. 17B, the sampling unit 1410 according to another exemplary embodiment may obtain a down-sampled luminance pixel RecL'(x,-1) corresponding to adjacent upper pixels Pc(x,-1) of a chrominance prediction unit according to equation, RecL'(x,-1)=RecL(2x, -1), with respect to adjacent upper pixels of a luminance prediction unit 1730. For example, the sampling unit 1410 may perform down-sampling by selecting a luminance pixel at (2x,-1) in luminance pixel groups 1731 above the luminance prediction unit 1730.

Also, the sampling unit 1410 may obtain a down-sampled luminance pixel RecL'(-1,y) corresponding to adjacent left pixels Pc(-1,y) of a chrominance prediction unit according to equation, RecL'(−1,y)=(RecL(−1,2y)+RecL(−1,2y+1))>>1, with respect to adjacent left pixels of the luminance prediction unit 1730. For example, the sampling unit 1410 may perform down-sampling by using an average value of luminance pixels RecL(−1,2y) and RecL(−1,2y+1) included in luminance pixel groups 1732 to the left of the luminance prediction unit 1730.

Also, the sampling unit 1410 may obtain a down-sampled luminance pixel RecL'(x,y) corresponding to inner pixels Pc(x,y) of a chrominance prediction unit according to equation, RecL'(x,y)=(RecL(2x,2y)+RecL(2x,2y+1))>>1, with respect to inner pixels of the luminance prediction unit 1730.

Referring to FIG. 17C, the sampling unit 1410 according to another exemplary embodiment may obtain a down-sampled luminance pixel RecL'(x,−1) corresponding to adjacent upper pixels Pc(x,−1) of a chrominance prediction unit according to equation, RecL'(x,−1)=RecL(2x, −1), with respect to adjacent upper pixels of a luminance prediction unit 1740. For example, the sampling unit 1410 may perform down-sampling by selecting a luminance pixel at (2x,−1) included in luminance pixel groups 1741 above the luminance prediction unit 1740.

Also, the sampling unit 1410 may obtain a down-sampled luminance pixel RecL'(−1,y) corresponding to adjacent left pixels Pc(−1,y) of a chrominance prediction unit according to equation, RecL'(−1,y)=(RecL(−2,2y)+RecL(−2,2y+1))>>1, with respect to adjacent left pixels of a luminance prediction unit 1740. For example, the sampling unit 1410 may perform down-sampling by using an average value of luminance pixels RecL(−2,2y) and RecL(−2,2y+1) included in luminance pixel groups 1742 to the left of the luminance prediction unit 1740.

Also, the sampling unit 1410 may obtain a down-sampled luminance pixel RecL'(x,y) corresponding to inner pixels Pc(x,y) of a chrominance prediction unit according to equation, RecL'(x,y)=(RecL(2x,2y)+RecL(2x,2y+1))>>1, with respect to inner pixels of the luminance prediction unit 1740.

The sampling unit 1410 according to another exemplary embodiment may obtain a down-sampled luminance pixel RecL'(x,−1) corresponding to adjacent upper pixels Pc(x,−1) of a chrominance prediction unit according to equation, RecL'(x,−1)=(RecL(2x−1,−1)+2*RecL(2x,−1)+RecL(2x+1,−1)+2)>>2, with respect to adjacent upper pixels of a luminance prediction unit. As described above with reference to FIG. 16A, the sampling unit 1410 may perform down-sampling by calculating a weighted average value by setting a weight of 2 to a center luminance pixel and a weight of 1 to each of luminance pixels at left and right of the center luminance pixel, with respect to adjacent upper luminance pixels of a luminance prediction unit.

Also, the sampling unit 1410 may obtain a down-sampled luminance pixel RecL'(−1,y) corresponding to adjacent left pixels Pc(−1,y) of a chrominance prediction unit according to equation, RecL'(−1,y)=(RecL(−1,2y)+RecL(−1,2y+1))>>1, with respect to adjacent left pixels of a luminance prediction unit, and obtain a down-sampled luminance pixel RecL'(x,y) corresponding to adjacent inner pixels Pc(x,y) of a chrominance prediction unit according to equation, RecL'(x,y)=(RecL(2x,2y)+RecL(2x,2y+1))>>1, with respect to inner pixels of a luminance prediction unit.

As such, the sampling unit 1410 according to exemplary embodiments obtains a down-sampled luminance pixel corresponding to a chrominance pixel by applying various sampling methods according to a location of a luminance pixel.

The sampling unit 1410 described above may perform down-sampling only in the 4:2:2 or 4:2:0 color format and skip down-sampling in the 4:4:4 color format since a luminance pixel and a chrominance pixel match 1:1.

In the 4:4:4 color format, since U component and V component signals relatively have more narrow bands than a Y component signal, a low band pass filter may be additionally applied to a restored luminance signal to improve prediction efficiency, instead of a down-sampling filter.

Hereinafter, a process of predicting a chrominance signal by using a luminance signal that is 1:1 matched with a chrominance signal via down-sampling will now be described. It is assumed that a luminance signal is down-sampled so as to 1:1 match a chrominance signal.

Figure 18A:
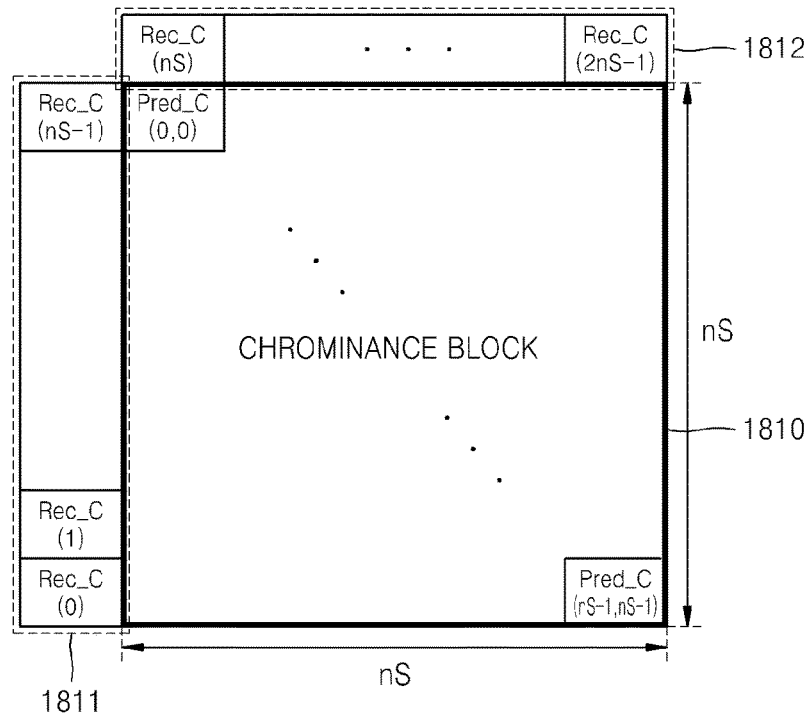
FIGS. 18A and 18B are reference diagrams for describing a process of obtaining a parameter indicating a correlation between a luminance signal and a chrominance signal and a process of predicting a chrominance signal, according to exemplary embodiments.
Figure 18B:
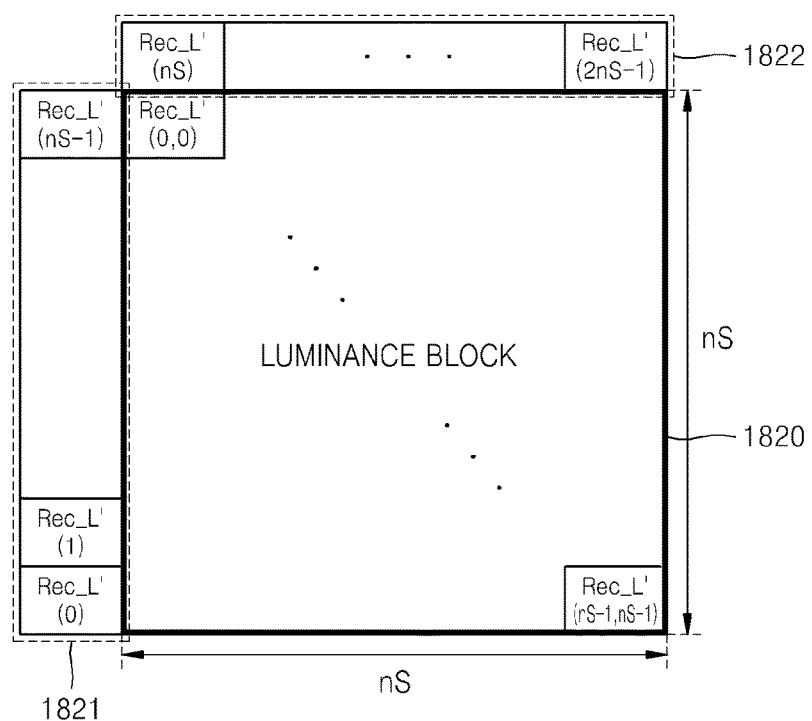

FIGS. 18A and 18B are reference diagrams for describing a process of obtaining a parameter indicating a correlation between a luminance signal and a chrominance signal and a process of predicting a chrominance signal, according to exemplary embodiments.

A luminance pixel and chrominance pixels, which correspond to each other, have a predetermined correlation, for example, a linear correlation. Referring to FIGS. 18A and 18B, when Rec_L'(x,y) denotes a pixel at an (x,y) location in a pre-restored luminance prediction unit 1820, the prediction performing unit 1430 may obtain a prediction value Pred_c(x,y) at an (x,y) location of a chrominance prediction unit 1810 by using a linear relationship between a luminance signal and a chrominance signal according to Equation 1 below.

$$\text{Pred}\_c(x,y) = a \cdot \text{Rec}\_L'(x,y) + b \qquad \text{[Equation 1]}$$

In Equation 1, a denotes a parameter indicating a weight and b denotes a parameter indicating an offset. Values of a and b may be obtained via calculations using adjacent pixels Rec_c(i) 1811 and 1812, wherein i is from 0 to 2nS−1, of the chrominance prediction unit 1810 and adjacent pixels Rec_L'(i) 1821 and 1822 of the pre-stored luminance prediction unit 1820, as shown in Equations 2 and 3.

$$a = \frac{I \cdot \sum_{i=0}^{I-1} \text{Rec}\_c(i) \cdot \text{Rec}\_L'(i) - \sum_{i=0}^{I-1} \text{Rec}\_c(i) \cdot \sum_{i=0}^{I-1} \text{Rec}\_L'(i)}{I \cdot \sum_{i=0}^{I-1} \text{Rec}\_L'(i) \cdot \text{Rec}\_L'(i) - \left(\sum_{i=0}^{I-1} \text{Rec}\_L'(i)\right)^2} \qquad \text{[Equation 2]}$$

$$= \frac{A1}{A2}$$

$$b = \frac{\sum_{i=0}^{I-1} \text{Rec}\_c(i) - a \cdot \sum_{i=0}^{I-1} \text{Rec}\_L'(i)}{I} \qquad \text{[Equation 2]}$$

In Equations 2 and 3, I denotes a number of adjacent upper and left pixels of the chrominance prediction unit 1810 or pre-stored luminance prediction unit 1820, and as shown in FIGS. 18A and 18B, when sizes of the chrominance prediction unit 1810 and pre-stored luminance prediction unit 1820 are nS×nS, I is 2nS. FIGS. 18A and 18B shows a case where upper and left pixels are used as adjacent pixels, but if adjacent right or lower pixels are processed and restored before a current prediction unit, the adjacent right or lower pixels may also be used to obtain the values of a and b. Also, in order to replace a multiplication or division operation to a shift operation, the number I of adjacent pixels may be a power of 2. Generally, since a value of nS defining a size of a prediction unit is a power of 2, I also has a value of power of 2.

Meanwhile, a floating point operation is used to calculate the value of a at high data accuracy by using Equation 2. However, when the value of a has a floating point value, Equation 2 includes floating point division, and thus complexity of operation is increased. Accordingly, the parameter obtaining unit 1420 according to exemplary embodiments calculates parameters a' and b' that are scaled according to an integer operation algorithm obtained by changing Equations 2 and 3 to simplify operations while preventing overflow.

In detail, in order to avoid a floating point operation, an integer a' obtained by up-scaling and rounding off the value of a by na bit is used instead of the value of a in Equation 2, as shown in Equation 4 below.

$$a' = a \cdot (1 << n_a)$$ [Equation 4]
$$= \frac{A1}{A2} \cdot (1 << n_a)$$

According to Equation 4, the value of a constituting a floating point number may be changed to the integer a' by being up-scaled and rounded off via a left operation (<<). The $n_a$ bit may be set by considering data accuracy and calculation complexity. For example, $n_a$ may be 13. Also, the value of b according to Equation 3 may be also changed to an integer b' obtained by changing and rounding off the value of a' in Equation 4. When the integers a' and b' are used, Equation 1 may be changed to Equation 5 below.

$$\text{Pred\_c}(x,y) = (a' \cdot \text{Rec\_L'}(x,y) \gg n_a) + b'$$ [Equation 5]

Meanwhile, in order to calculate the integer a' based on Equation 4, a calculation of A1/A2 is required. Approximate values A1' and A2' generated by changing bits excluding a predetermined number of upper bits of A1 and A2 to 0 may be used instead of A1 and A2. In detail, the approximate value A1' generated by changing the bits excluding the upper $n_{A1}$ bits of A1 to 0 and the approximate value A2' generated by changing the bits excluding upper $n_{A2}$ bits of A2 to 0 may be respectively represented by Equations 6 and 7 below.

$$A1' = [A1 \gg r_{A1}] \cdot 2^{r_{A1}}$$ [Equation 6]

$$A2' = [A2 \gg r_{A2}] \cdot 2^{r_{A2}}$$ [Equation 7]

In Equation 6, a [.] operation indicates a floor operation, i.e., an operation of selecting a maximum integer smaller than a value inside [ ], $r_{A1}$=max (bdepth(A1)−$n_{A1}$, 0) and $r_{A2}$=max (bdepth(A2)−$n_{A2}$, 0). bdepth(A1) and bdepth(A2) respectively indicate bit depths of A1 and A2. Also, $n_{A1}$ may be set while considering a number of bits generated during multiplication so as to prevent overflow, and for example, $n_{A1}$ may be 15. Also, $n_{A2}$ is related to a size of a look-up table to be described later, and for example, $n_{A2}$ may be 6 in a look-up table based on 64 variables.

Figures 19, 20:
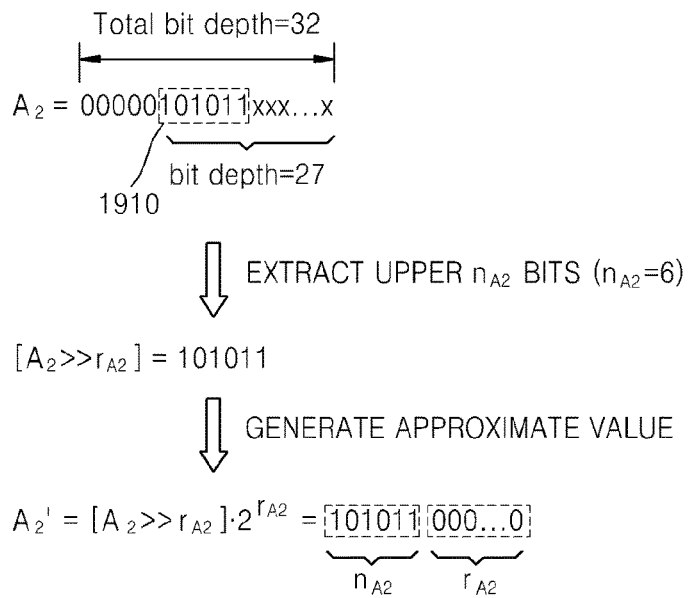
FIG. 19 is a diagram for describing a process of obtaining an approximate value, according to an exemplary embodiment.
FIG. 20 is a reference diagram of a lookup table according to an exemplary embodiment.

FIG. 19 is a diagram for describing a process of obtaining an approximate value A2', according to an exemplary embodiment.

As shown in FIG. 19, it is assumed that a bit depth of A2 is 27 and an entire bit depth is 32. When $n_{A2}$=6, and $r_{A2}$=max(27−6, 0)=21, 101011' 1910 that are upper 6 bits of A2 is extracted via an operation of [A2>>21]. When $2^{r_{A2}}$, i.e., $2^{21}$, is multiplied again to a value of [A2>>21], remaining 21 bits excluding the upper 6 bits have a value of 0, and thus an approximate value A2' is obtained.

When Equations 6 and 7 are applied to Equation 4, Equation 8 is obtained.

$$a' \approx \frac{[A1 \gg r_{A1}] \cdot 2^{r_{A1}}}{[A2 \gg r_{A2}] \cdot 2^{r_{A2}}} \cdot 2^{n_a}$$ [Equation 8]
$$= \frac{2^{n_{table}} \cdot [A1 \gg r_{A1}] \cdot 2^{r_{A1}+n_a}}{[A2 \gg r_{A2}] \cdot 2^{r_{A2}+n_{table}}}$$
$$\approx \left[\frac{2^{n_{table}}}{A2 \gg r_{A2}}\right] \cdot [A1 \gg r_{A1}] \cdot 2^{r_{A1}+n_a-(r_{A2}+n_{table})}$$

In Equation 8, $n_{table}$ may be determined considering data accuracy and operation complexity, and for example, $n_{table}$ may be 15.

In Equation 8, $$\left[\frac{2^{n_{table}}}{A2 \gg r_{A2}}\right]$$

includes a division operation. In order to prevent a division operation, a result value of $$\left[\frac{2^{n_{table}}}{A2 \gg r_{A2}}\right]$$

may be stored in a predetermined look-up table instead of a division operation, and a value of a' may be obtained according to Equation 8 by referring to the predetermined look-up table. When the predetermined look-up table is used as such, the value of a' may be obtained via only multiplication and shift operations without having to perform a division operation while calculating a' based on Equation 8.

FIG. 20 is a reference diagram of a lookup table according to an exemplary embodiment.

When $n_{A2}$=6, a number of cases of $$\left[\frac{2^{n_{table}}}{A2 \gg r_{A2}}\right]$$

is equal to a number of cases of upper 6 bits of A2. In other words, $$\left[\frac{2^{n_{table}}}{A2 \gg r_{A2}}\right]$$

may be determined by using a look-up table having $2^{\wedge}(n_{A2})$ =$2^{\wedge}6$, i.e., a total of 64 elements.

Accordingly, the parameter obtaining unit 1420 may obtain $$\left[\frac{2^{n_{table}}}{A2 \gg r_{A2}}\right]$$

by using a look-up table storing $$\left[\frac{2^{n_{table}}}{A2 \gg r_{A2}}\right]$$

corresponding to 64 variables of the upper 6 bits of A2, as shown in FIG. 20. When $$\left[\frac{2^{n_{table}}}{A2 >> r_{A2}}\right]$$

is obtained, the parameter obtaining unit 1420 may calculate the value of a' by using multiplication and shift operations based on Equation 8.

Also, the parameter obtaining unit 1420 may calculate a value of b' according to Equation 9 by using the obtained value of a'.

$$b' = \frac{\sum_{i=0}^{I-1} \text{Rec\_c}(i) - \left(a' \cdot \left(\sum_{i=0}^{I-1} \text{Rec\_L}'(i)\right) >> n_a\right)}{I} \quad \text{[Equation 9]}$$

The value of b' based on Equation 9 may be calculated without a division operation when I is a power of 2. If I is not a power of 2 since upper left or upper right adjacent pixels are used, instead of adjacent pixels shown in FIGS. 18A and 18B, as adjacent pixels, a value of (1/I) may be stored in a look-up table and the value of b' may be obtained by multiplying the value of (1/I) according to the look-up table by a numerator of Equation 9.

The value of a' based on Equation 8 may be clipped such that a multiplication operation according to Equation 5 is performed within predetermined bits. For example, when the multiplication operation according to Equation 5 is performed in 16 bits, the value of a' is clipped within a range of $[-2^{-15}, 2^{15}-1]$. When $n_a$ is 13, an actual value of a may be limited to a range of $[-4, 4)$ so as to prevent an error.

Meanwhile, in order to decrease a rounding error while the parameter obtaining unit 1420 calculates the value of a' based on Equation 8, $n_a$ may be adaptively determined according to values of A1 and A2, instead of being a constant. For example, $n_a$ may be determined according to Equation 10 below.

$$n_a = r_{A2} + n_{table} - r_{A1} \quad \text{[Equation 10]}$$

When Equation 10 is substituted for Equation 8, Equation 11 below may be obtained.

$$a' \approx \left[\frac{2^{n_{table}}}{A2 >> r_{A2}}\right] \cdot [A1 >> r_{A1}] \quad \text{[Equation 11]}$$

In order to maintain the value of a' to a predetermined bit, the bit depth of a' may have to be adjusted. For example, in order to maintain the bit depth of a' to a (a_bits) bit, when a variable bitAdjust for adjusting the bit depth of a' is obtained according to equation, bitAdjust=max(0, bdepth (abs(a'))−(a_bits−1)), the parameter obtaining unit 1420 decreases the bit depth of a' via a'=a'>>bitAdjust. In order to maintain the value of a' to be lower than 8 bits, a typical value of a_bits may be 7 or 8. A rounding error of the value a' may be decreased while maintaining the value of a' to be within predetermined bits by applying $n_a$ of Equation 12 below to Equation 5, instead of $n_a$ of Equation 11.

$$n_a = r_{A2} + n_{table} - r_{A1} - \text{bitAdjust} \quad \text{[Equation 12]}$$

As such, the parameter obtaining unit 1420 according to an exemplary embodiment obtains the values of a' and b' for defining a correlation between a luminance signal and a chrominance signal according to Equations 8 and 9. When the values of a' and b' are obtained, the prediction performing unit 1430 generates a prediction value of a corresponding chrominance pixel from a restored luminance pixel based on Equation 5.

Meanwhile, Equation 2 above may be expressed as Equation 13 below.

$$a = \frac{A1}{A2} = \frac{I \cdot CL - C \cdot L}{I \cdot LL - l \cdot L} \quad \text{[Equation 13]}$$

In equation 13, values of CL, C, L, and LL may be calculated according to Equation 14 below.

$$CL = \sum_{i=0}^{I-1} \text{Rec\_c}(i) \cdot \text{Rec\_L}'(i) \quad \text{[Equation 14]}$$

$$C = \sum_{i=0}^{I-1} \text{Rec\_c}(i)$$

$$LL = \sum_{i=0}^{I-1} \text{Rec\_L}'(i) \cdot \text{Rec\_L}'(i)$$

$$L = \sum_{i=0}^{I-1} \text{Rec\_L}'(i)$$

In order to prevent overflow while calculating the value of a according to Equation 13, the parameter obtaining unit 1420 performs de-scaling to reduce numbers of bits of the values of CL, C, L, and LL.

For example, when a number of bits of a sample, such as Rec_L'(i) or Rec_c(i), is $n_s$, maximum bits $\text{bits}_{max}$ of A1 and A2 are calculated according to Equation 15 below.

$$\text{bits}_{max} = (n_s + \text{bdepth}(I)) \cdot 2 + 1 \quad \text{[Equation 15]}$$

In order to maintain the maximum bits $\text{bits}_{max}$ to be predetermined A bits, wherein A is an integer, a bit depth needs to be reduced by a number of bits exceeding the predetermined A bits. For example, when A=32, a bit adjusting parameter $\text{bitAdjust}_A$ may be represented by Equation 16 below.

$$\text{bitAdjust}_A = \max(\text{bits}_{max} - 32, 0) \quad \text{[Equation 16]}$$

By applying Equation 16, the parameter obtaining unit 1420 scales the values of A1 and A1 according to Equation 17 below.

$$A1 = I \cdot [CL \gg \text{bitAdjust}_A] - [L \gg \text{bitAdjust}_A/2] \cdot [C \gg \text{bitAdjust}_A/2]$$

$$A2 = I \cdot [LL \gg \text{bitAdjust}_A] - [L \gg \text{bitAdjust}_A/2] \cdot [L \gg \text{bitAdjust}_A/2] \quad \text{[Equation 17]}$$

If I is a power of 2, a bit adjusting parameter $\text{bitAdjust2}_A$ may be newly defined according to Equation 18 below.

$$\text{bitAdjust2}_A = (\text{bitAdjust}_A + 1)/2 \quad \text{[Equation 18]}$$

By using the bit adjusting parameter $\text{bitAdjust2}_A$ of Equation 18, the parameter obtaining unit 1420 may de-scale the values of CL, C, LL, L, and I according to Equation 19 below before calculating the values of A1 and A2.

$$CL = [CL \gg \text{bitAdjust2}_A]$$

$$C = [C \gg \text{bitAdjust2}_A]$$

$LL=[LL \gg bitAdjust2_A]$ $L=[L \gg bitAdjust2_A]$ $I=[I \gg bitAdjust2_A]$ [Equation 19]

As such, the parameter obtaining unit 1420 according to another exemplary embodiment decreases the bit depth by de-scaling the values of CL, C, LL, L, and I used to calculate the values of A1 and A2 according to Equation 19 such that overflow is not generated, while considering ranges of the values of A1 and A2.

Meanwhile, the parameter obtaining unit 1420 according to another exemplary embodiment obtains a parameter k3 defined by Equation 20 below, based on nS defining the sizes of the chrominance prediction unit 1810 and pre-stored luminance prediction unit 1820 and bit depth $BitDepth_c$ of Rec_C(i).

$k3=Max(0, BitDepth_C + \log_2(nS) - 14)$ [Equation 20]

The parameter obtaining unit 1420 de-scales the values of CL, C, LL, and L according to Equation 21 so as to prevent overflow while calculating the values of A1 and A2.

$CL = CL \gg k3$ $C = C \gg k3$ $LL = LL \gg k3$ $L = L \gg k3$ [Equation 21]

Also, the parameter obtaining unit 1420 obtains a parameter k2 defined by Equation 22 below based on the parameter k3 and nS.

$k2 = \log_2(nS \gg k3)$ [Equation 22]

Also, the parameter obtaining unit 1420 may obtain the values of A1 and A2 according to Equation 23 below by using the values of CL, C, LL, and L de-scaled according to Equation 21 above and the parameter k2 according to Equation 21.

$A1 = (LC << k2) - L*C$ $A2 = (LL << k2) - L*L$ [Equation 23]

The parameter obtaining unit 1420 may generate values of A1' and A2' obtained by down-scaling the values of A1 and A2 according to Equation 24 below, such that the values of A1 and A2 are expressed within bits of a predetermined range.

$A1' = A1 \gg Max(0, \log_2(abs(A1)) - 14)$ $A2' = abs(A2 \gg Max(0, \log_2(abs(A2)) - 5))$ [Equation 24]

As such, when the values of A1' and A2' are obtained, the parameter obtaining unit 1420 obtains values of a weight a and offset b indicating a linear correlation between a luminance signal and a chrominance signal according to the following algorithm.

```
{
  k1=Max(0,log2(abs(A2))-5)-Max(0,log2(abs(A1))-14)+2;
  a=A2'<1 ? 0 : Clip3(-2^15,2^15-1,A1'*lmDiv+(1<<(k1-1))>>k1;
  a=a>>Max(0,log2(abs(a))-6);
  k=13-Max(0,log2(abs(a))-6);
  b=(L-((a*C)>>k1)+(1<<(k2-1)))>>k2;
}
```

In the above algorithm, the constants may be determined such that the value of weight a is expressed in 7-bit data. 1mDiv denotes a predetermined value determined according to A2' of Equation 23.

When the values of weight a and offset b are determined according to the above algorithm, the prediction performing unit 1430 according to another exemplary embodiment obtains a prediction value Pred_C(x,y) of a chrominance signal corresponding to a restored luminance signal Rec_L'(x,y) according to Equation 25 below.

$Pred\_C(x,y) = (a \cdot Rec\_L'(x,y)) \gg k) + b$ [Equation 25]

Here, k may be 13. The prediction performing unit 1430 may clip the prediction value Pred_C(x,y) of the chrominance signal according to Equation 25, as shown in Equation 26 below such that the prediction value Pred_C(x,y) exists within a range of values of the chrominance signal considering a bit depth of the chrominance signal.

$Pred\_C(x,y) = Clip1_c(a \cdot Rec\_L'(x,y)) \gg k) + b$ [Equation 26]

Figure 21:
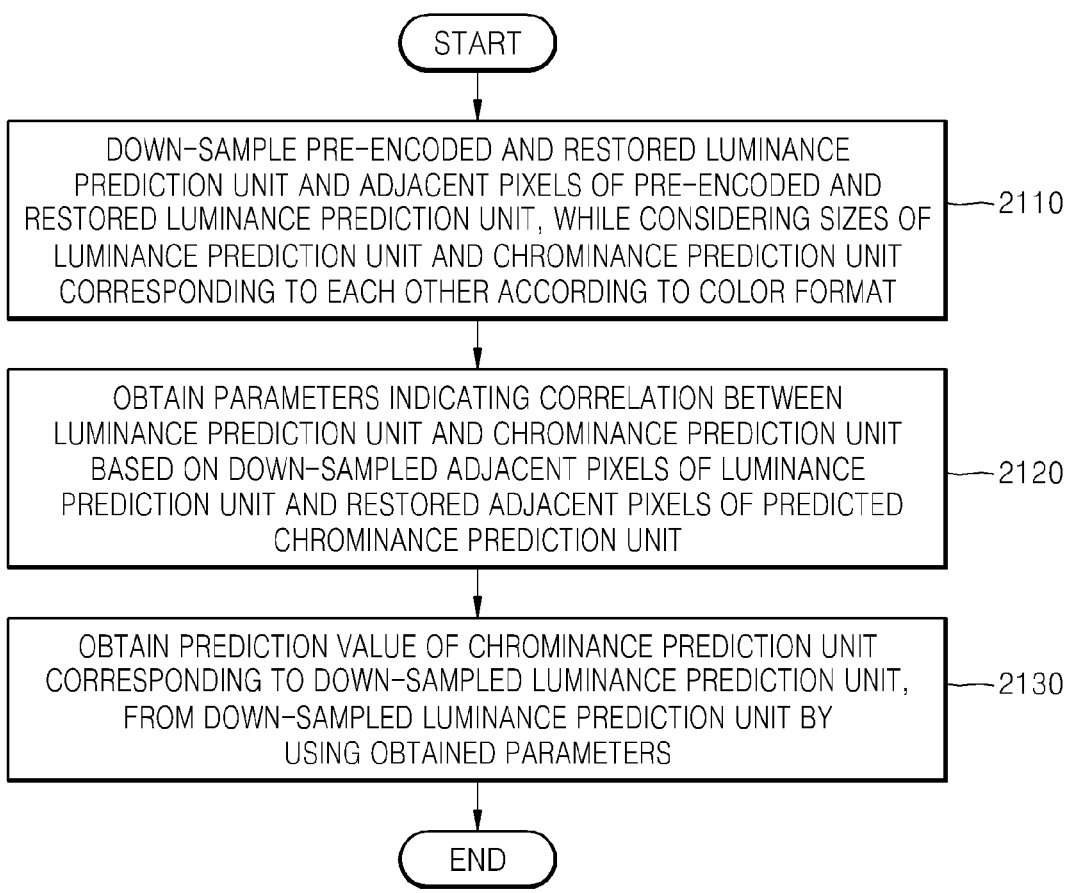
FIG. 21 is a flowchart illustrating a method of predicting a chrominance component image, according to an exemplary embodiment.

FIG. 21 is a flowchart illustrating a method of predicting a chrominance component image, according to an exemplary embodiment.

Referring to FIG. 21, in operation 2110, the sampling unit 1410 down-samples a pre-encoded and restored luminance prediction unit and adjacent pixels of the pre-encoded and restored luminance prediction unit, while considering sizes of a luminance prediction unit and chrominance prediction unit, which correspond to each other, according to a color format. As described above, the sampling unit 1410 down-samples a luminance pixel to 1:1 match a chrominance pixel by applying various down-sampling methods, such as a down-sampling method using an average value of a plurality of adjacent luminance pixels on a line in a predetermined direction selected from a luminance pixel group having a predetermined size, a down-sampling method using a weighted average value of a plurality of adjacent luminance pixels located in a predetermined direction selected from the luminance pixel group having the predetermined size, and a down-sampling method selecting a luminance pixel at a predetermined location in the luminance pixel group having the predetermined size, with respect to each of inner pixels of the luminance prediction unit, adjacent upper pixels of the luminance prediction unit, and adjacent left pixels of the luminance prediction unit.

In operation 2120, parameters indicating a correlation between the luminance prediction unit and a chrominance prediction unit are obtained based on the down-sampled adjacent pixels of the luminance prediction unit and restored adjacent pixels of a predicted chrominance prediction unit. As described above, the parameter obtaining unit 1420 calculates the values of weight a and offset b according to Equations 2 and 3 by using the restored adjacent pixels of the chrominance prediction unit and the restored adjacent pixels of the luminance prediction unit. Specifically, the parameter obtaining unit 1420 may change bit depths of the weight a and offset b so as to improve data accuracy and prevent overflow that may be generated during a calculation operation. Also, the parameter obtaining unit 1420 obtains the values of weight a and offset b only by using multiplication, subtraction, and shift operations excluding a division operation by scaling variables used while calculating the values of weight a and offset b or replacing the variables to approximate values.

In operation 2130, the prediction performing unit obtains a prediction value of a chrominance prediction unit corresponding to the down-sampled luminance prediction unit, from the down-sampled luminance prediction unit by using the obtained parameters. As described above, the prediction performing unit 1430 predicts a corresponding chrominance signal from a luminance signal restored based on Equation 1. Also, the prediction performing unit 1430 may perform prediction by up-scaling the values of weight a and offset b so as to perform an integer operation instead of an operation using a floating point as shown in Equation 7.

According to exemplary embodiments, prediction efficiency may be improved by using a correlation between a luminance signal and a chrominance signal.

Also, according to exemplary embodiments, throughput for prediction may be decreased while improving an operation speed by obtaining a parameter for defining a linear relationship between a luminance signal and a chrominance signal without having to perform a division operation.

Furthermore, according to exemplary embodiments, overflow that may be generated while obtaining a parameter may be prevented while maintaining data accuracy.

The exemplary embodiments may be written as computer programs and may be implemented in general-use digital computers that execute the programs by using a computer readable recording medium. Examples of the computer readable recording medium include magnetic storage media (e.g., ROM, floppy disks, hard disks, etc.), optical recording media (e.g., CD-ROMs, or DVDs), and storage media. Moreover, one or more of the above-described elements can include a processor or microprocessor executing a computer program stored in a computer-readable medium.

While exemplary embodiments have been particularly shown and described above, it will be understood by those of ordinary skill in the art that various changes in form and details may be made therein without departing from the spirit and scope of the inventive concept as defined by the appended claims. Exemplary embodiments should be considered in a descriptive sense only and not for purposes of limitation. Therefore, the scope of the invention is defined not by the detailed description of exemplary embodiments but by the appended claims, and all differences within the scope will be construed as being included in the present invention.

What is claimed is:

1. A method of predicting a chrominance component image by using a luminance component image, the method comprising:
   down-sampling inner pixels of a luminance prediction unit and adjacent pixels of the luminance prediction unit, the luminance prediction unit having been pre-encoded and pre-restored, considering a size of a luminance prediction unit and a size of a chrominance prediction unit corresponding to each other according to a color format;
   obtaining parameters indicating a correlation between the luminance prediction unit and a predicted chrominance prediction unit based on the down-sampled adjacent pixels of the luminance prediction unit and restored adjacent pixels of the predicted chrominance prediction unit; and
   obtaining, from the down-sampled luminance prediction unit by using the obtained parameters, a prediction value of a chrominance prediction unit corresponding to the down-sampled luminance prediction unit,
   wherein the down-sampling comprises:
      selecting a first location of a luminance pixel to be selected from a predetermined luminance pixel group or a first filtering method of luminance pixels, for down-sampling with respect to the inner pixels of the luminance prediction unit;
      selecting a second location of a luminance pixel to be selected from the predetermined luminance pixel group or a second filtering method of luminance pixels, for down-sampling with respect to adjacent upper pixels of the luminance prediction unit; and
      selecting a third location of a luminance pixel to be selected from the predetermined luminance pixel group or a third filtering method of luminance pixels, for down-sampling with respect to adjacent left pixels of the luminance prediction unit,
   wherein the first location and first filtering method used for down-sampling with respect to the inner pixels of the luminance prediction unit, the second location and second filtering method used for down-sampling with respect to the adjacent upper pixels of the luminance prediction unit, and the third location and third filtering method used for down-sampling with respect to the adjacent left pixels of the luminance prediction unit are independently selected,
   wherein, when the size of the luminance prediction unit is 2nS×2nS where nS is a positive integer:
      the chrominance prediction unit corresponding to the luminance prediction unit is nS×nS, an inner pixel of the luminance prediction unit is RecL(x,y) where x and y are each from 0 to 2nS-1, an upper pixel of the luminance prediction unit is RecL(x,-1) where x is from 0 to 2nS-1, a left pixel of the luminance prediction unit is RecL(-1,y) where y is from 0 to 2nS-1, and a down-sampled luminance pixel corresponding to a chrominance pixel at (x,y) is RecL'(x,y);
      a down-sampled luminance pixel RecL(x,-1) corresponding to an adjacent upper pixel Pc(x,-1) of the chrominance prediction unit is obtained according to equation, RecL'(x,-1)=(RecL(2x-1,-1)+2*RecL(2x,-1)+RecL(2x+1,-1)+2)>>2 or RecL'(x,-1)= RecL(2x, -1), with respect to adjacent upper pixels of the luminance prediction unit;
      a down-sampled luminance pixel RecL'(-1,y) corresponding to an adjacent left pixel Pc(-1,y) of the chrominance prediction unit is obtained according to equation, RecL'(-1,y)=(RecL(-1,2y)+RecL(-1,2y=1))>>1, with respect to adjacent left pixels of the luminance prediction unit; and
      a down-sampled luminance pixel RecL'(x,y) corresponding to inner pixels Pc(x,y) of the chrominance prediction unit is obtained according to equation, RecL'(x,y)=(RecL(2x,2y)+RecL(2x,2y+1))>>1, with respect to the inner pixels of the luminance prediction unit.

2. The method of claim 1, wherein the parameters comprise a weight and offset value defining a linear relationship between a restored pixel of the luminance prediction unit and a corresponding pixel of the chrominance prediction unit.

3. The method of claim 2, wherein, when a restored pixel at a down-sampled (x,y) location of the luminance prediction unit is $Rec_{13}L'(x,y)$:
   a prediction value of a pixel at a (x,y) location of the chrominance prediction unit is $Pred_{13}C(x,y)$, the weight is a, and the offset value is b; and
   the correlation is defined according to equation, $Pred_{13}C(x,y)$=a*Rec L'(x,y)+b.

4. The method of claim 3, wherein, when I adjacent restored pixels of the luminance prediction unit are Rec_L'

(i) where I is an integer from 0 to I-1, and I adjacent restored pixels of the chrominance prediction unit are Rec_C(i), the weight a is determined according to equation, $$a = \frac{I \cdot \sum_{i=0}^{I-1} \text{Rec}\_c(i) \cdot \text{Rec}\_L'(i) - \sum_{i=0}^{I-1} \text{Rec}\_c(i) \cdot \sum_{i=0}^{I-1} \text{Rec}\_L'(i)}{I \cdot \sum_{i=0}^{I-1} \text{Rec}\_L'(i) \cdot \text{Rec}\_L'(i) - \left(\sum_{i=0}^{I-1} \text{Rec}\_L'(i)\right)^2}$$

$$= \frac{A1}{A2}.$$

5. The method of claim 3, wherein the offset value b is determined according to equation, $$b = \frac{\sum_{i=0}^{I-1} \text{Rec}\_c(i) - a \cdot \sum_{i=0}^{I-1} \text{Rec}\_L'(i)}{I}.$$

6. The method of claim 1, wherein:
the luminance component image corresponds to an input picture encoded based on a hierarchical structure, in which the input picture is hierarchically split from a plurality of maximum coding units, according to information about a maximum size of a coding unit, into coding units of coded depths according to depths;
a coding unit of a current depth is one of rectangular data units split from a coding unit of an upper depth;
the coding unit of the current depth is split into coding units of a lower depth, independently from neighboring coding units; and
coding units of the hierarchical structure comprise encoded coding units among the coding units split from a maximum coding unit.

7. An apparatus for predicting a chrominance component image by using a luminance component image, the apparatus comprising:
a sampler configured to down-sample, by a processor, inner pixels of a luminance prediction unit and adjacent pixels of the luminance prediction unit, the luminance prediction unit having has been pre-encoded and pre-restored, considering a size of a luminance prediction unit and a size of a chrominance prediction unit corresponding to each other according to a color format;
a parameter obtainer configured to obtain, by a processor, parameters indicating a correlation between the luminance prediction unit and a predicted chrominance prediction unit based on the down-sampled adjacent pixels of the luminance prediction unit and restored adjacent pixels of the predicted chrominance prediction unit; and
a prediction performer configured to obtain, by a processor, from the down-sampled luminance prediction unit by using the obtained parameters, a prediction value of a chrominance prediction unit corresponding to the down-sampled luminance prediction unit,
wherein the sampler selects a first location of a luminance pixel to be selected from a predetermined luminance pixel group or a first filtering method of luminance pixels, for down-sampling with respect to the inner pixels of the luminance prediction unit, selects a second location of a luminance pixel to be selected from the predetermined luminance pixel group or a second filtering method of luminance pixels, for down-sampling with respect to adjacent upper pixels of the luminance prediction unit, and selects a third location of a luminance pixel to be selected from the predetermined luminance pixel group or a third filtering method of luminance pixels, for down-sampling with respect to adjacent left pixels of the luminance prediction unit,
wherein the sampler independently selects the first location and first filtering method used for down-sampling with respect to the inner pixels of the luminance prediction unit, the second location and second filtering method used for down-sampling with respect to the adjacent upper pixels of the luminance prediction unit, and the third location and third filtering method used for down-sampling with respect to the adjacent left pixels of the luminance prediction unit,
wherein, when the size of the luminance prediction unit is 2nS×2nS where nS is a positive integer:
the chrominance prediction unit corresponding to the luminance prediction unit is nS×nS, an inner pixel of the luminance prediction unit is RecL(x,y) where x and y are each from 0 to 2nS-1, an upper pixel of the luminance prediction unit is RecL(x,-1) where x is from 0 to 2nS-1, a left pixel of the luminance prediction unit is RecL(-1,y) where y is from 0 to 2nS-1, and a down-sampled luminance pixel corresponding to a chrominance pixel at (x,y) is RecL'(x,y); and
the sampler obtains a down-sampled luminance pixel RecL(x,-1) corresponding to an adjacent upper pixel Pc(x,-1) of the chrominance prediction unit according to equation, RecL'(x,-1)=(RecL(2x-1,-1)+2*RecL(2x,-1)+RecL(2x+1,-1)+2)>>2 or RecL'(x,-1)=RecL(2x, -1), with respect to adjacent top pixels of the luminance prediction unit, obtains a down-sampled luminance pixel RecL'(-1,y) corresponding to an adjacent left pixel Pc(-1,y) of the chrominance prediction unit according to equation, RecL'(-1,y)=(RecL(-1, 2y)+RecL(-1,2y+1))>>1, with respect to adjacent left pixels of the luminance prediction unit, and obtains a down-sampled luminance pixel RecL'(x,y) corresponding to inner pixels Pc(x,y) of the chrominance prediction unit according to equation, RecL'(x,y)=(RecL(2x, 2y)+RecL(2x,2y+1))>>1, with respect to the inner pixels of the luminance prediction unit.

8. A non-transitory computer readable recording medium having recorded thereon a computer program for executing the video encoding method of claim 1.

* * * * *